United States Patent
Terada

(10) Patent No.: US 8,098,552 B2
(45) Date of Patent: Jan. 17, 2012

(54) INFORMATION PROCESSING DEVICE AND METHOD AND PROGRAM

(75) Inventor: Akio Terada, Kanagawa (JP)

(73) Assignee: Sony Corporation, Tokyo (JP)

( * ) Notice: Subject to any disclaimer, the term of this patent is extended or adjusted under 35 U.S.C. 154(b) by 227 days.

(21) Appl. No.: 12/481,102

(22) Filed: Jun. 9, 2009

(65) Prior Publication Data

US 2009/0310450 A1     Dec. 17, 2009

(30) Foreign Application Priority Data

Jun. 12, 2008  (JP) ................. 2008-154151

(51) Int. Cl.
*G11B 7/00* (2006.01)
(52) U.S. Cl. ................................ 369/47.53
(58) Field of Classification Search ............ 369/47.51, 369/47.53, 47.52, 119, 116, 47.5, 47.36, 369/120, 275.3
See application file for complete search history.

(56) References Cited

U.S. PATENT DOCUMENTS

| | | | | |
|---|---|---|---|---|
| 5,530,687 A | * | 6/1996 | Yamaguchi | 369/53.36 |
| 5,841,747 A | * | 11/1998 | Kubota et al. | 369/47.52 |
| 2005/0030861 A1 | * | 2/2005 | Matsui et al. | 369/47.53 |

FOREIGN PATENT DOCUMENTS

| | | |
|---|---|---|
| JP | 2002-133666 A | 5/2002 |
| JP | 2005-122794 A | 5/2005 |
| JP | 2006-044215 A | 2/2006 |
| JP | 2006-268937 A | 10/2006 |
| JP | 2007-287214 A | 11/2007 |
| JP | 2008-130138 A | 6/2008 |

* cited by examiner

*Primary Examiner* — Nabil Z Hindi
(74) *Attorney, Agent, or Firm* — Wolf, Greenfield & Sacks, P.C.

(57) ABSTRACT

An information processing device includes: a writing and erasing means for writing and erasing predetermined information to and from a predetermined recording area of a writable optical disc serving as a recording medium; an estimation information writing means for writing estimation information to the recording area to and from which the information is written and erased by the writing and erasing means; and an estimation means for reading the estimation information written to the recording area by the estimation information writing means and estimating a reproduced signal of the read estimation information.

20 Claims, 21 Drawing Sheets

FIG. 19A SIMPLE ERASING METHOD OPC CONVERGENT VALUE
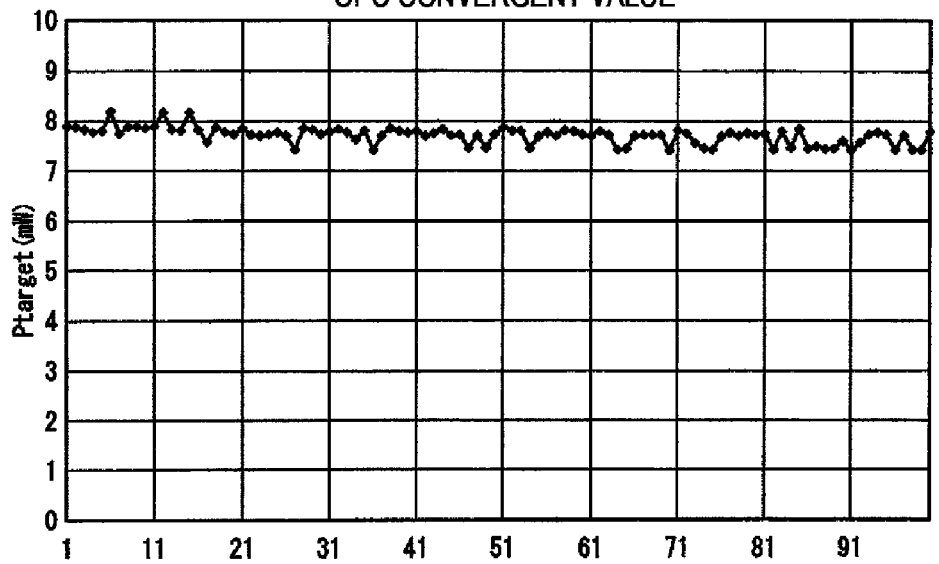
FIG. 19B WRITING ERASING METHOD OPC CONVERGENT VALUE
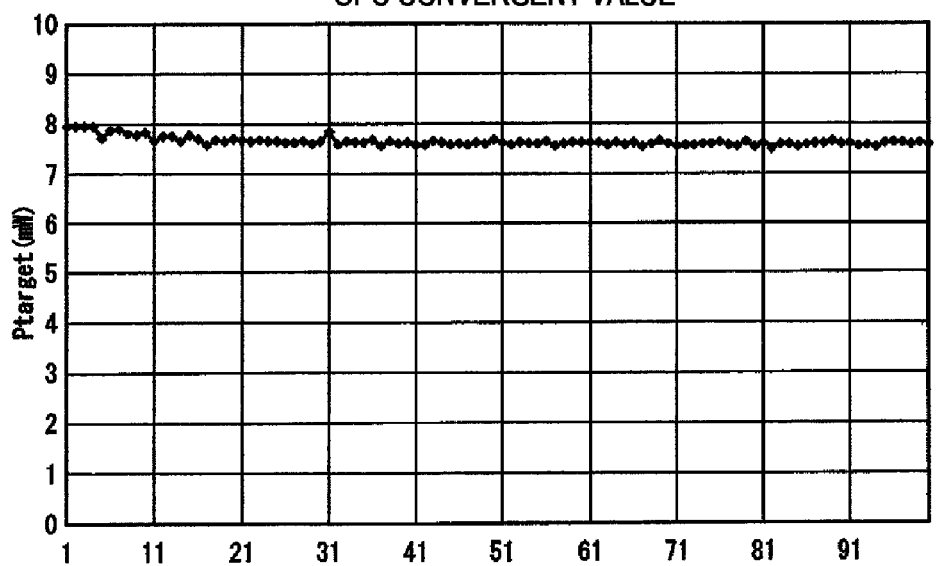

INFORMATION PROCESSING DEVICE AND METHOD AND PROGRAM

BACKGROUND OF THE INVENTION

1. Field of the Invention

The present invention relates to information processing device and method and a program thereof, and more particularly, to information processing device and method and a program capable of easily improving stability of an OPC convergent value.

2. Related Art

In the past, an optical disc unit writing data to a writable optical disc has performed an optimal power calibration (OPC) process for optimizing the power of laser beam at the time of recording information before recording information. The optical disc unit performs the OPC process on a power calibration area (PCA) which is a rewritable area of the optical disc (for example, see JP-A-2004-273074 and JP-A-10-134389).

SUMMARY OF THE INVENTION

However, since information is repeatedly written to and erased from the same recording unit block (RUB) of the PCA in the OPC, the erasing remnants (antecedents) of information could be easily generated in the related art. As a result, RF amplitude values acquired as estimation values are uneven and thus the unevenness of the OPC convergence result might increase or the convergence may not occur.

Particularly, for example, when the peak power is changed or the OPC process is performed with different power levels, the erasing remnants (antecedents) of information are left as complex patterns, whereby the unevenness of the OPC convergence result may further increase (the convergence is not accomplished). In the methods described in JP-A-2004-273074 and JP-A-10-134389, the optimal value of erasing power should be calculated whenever the power level is changed, thereby requiring troublesome works and enhancing the time of the OPC process.

Thus, there is a need to easily improve the stability of an OPC convergent value.

According to an embodiment of the invention, there is provided an information processing device including: a writing and erasing means for writing and erasing predetermined information to and from a predetermined recording area of a writable optical disc serving as a recording medium; an estimation information writing means for writing estimation information to the recording area to and from which the information is written and erased by the writing and erasing means; and an estimation means for reading the estimation information written to the recording area by the estimation information writing means and estimating a reproduced signal of the read estimation information.

The writing and erasing means may write a pattern including marks having a predetermined pulse train and spaces having a predetermined level of steady-state value as the information to the recording area.

The writing and erasing means may erase the information by emitting a laser beam with a level capable of erasing the marks written to the recording area.

The estimation information writing means may write the estimation information including a repeated pattern to the recording area using a constant power level as peak power.

The estimation information writing means may write the estimation information including a repeated pattern to the recording area while changing peak power in a step shape.

According to another embodiment of the invention, there is provided an information processing method of an information processing device including a writing and erasing means, an estimation information writing means, and an estimation means, the method including the steps of writing and erasing, by the writing and erasing means, predetermined information to and from a predetermined recording area of a writable optical disc serving as a recording medium; writing estimation information, by the estimation information writing means, to the recording area to and from which the information is written and erased; and reading the estimation information written to the recording area and estimating a reproduced signal of the read estimation information by the estimating means.

According to still another embodiment of the invention, there is provided a program allowing a computer to function as: a writing and erasing means for writing and erasing predetermined information to and from a predetermined recording area of a writable optical disc serving as a recording medium; an estimation information writing means for writing estimation information to the recording area to and from which the information is written and erased by the writing and erasing means; and an estimation means for reading the estimation information written to the recording area by the estimation information writing means and estimating a reproduced signal of the read estimation information.

In the embodiments of the invention, predetermined information is written to and erased from a predetermined recording area of a writable optical disc serving as a recording medium, estimation information is written to the recording area to and from which the information is written and erased by the writing and erasing means, and the estimation information written to the recording area by the estimation information writing means is read and a reproduced signal of the read estimation information is estimated.

According to the above-mentioned embodiments, it is possible to calculate an optimal power level. Particularly, it is possible to easily improve the stability of an OPC convergent value.

BRIEF DESCRIPTION OF THE DRAWINGS

FIGS. 19A and 19B are diagrams illustrating a comparison of an OPC convergent value trend.

DESCRIPTION OF THE PREFERRED EMBODIMENTS

First, a basic flow of an OPC process performed on a writable optical disc loaded into a tray by a recording and reproducing apparatus (not shown) will be described.

Figure 1:
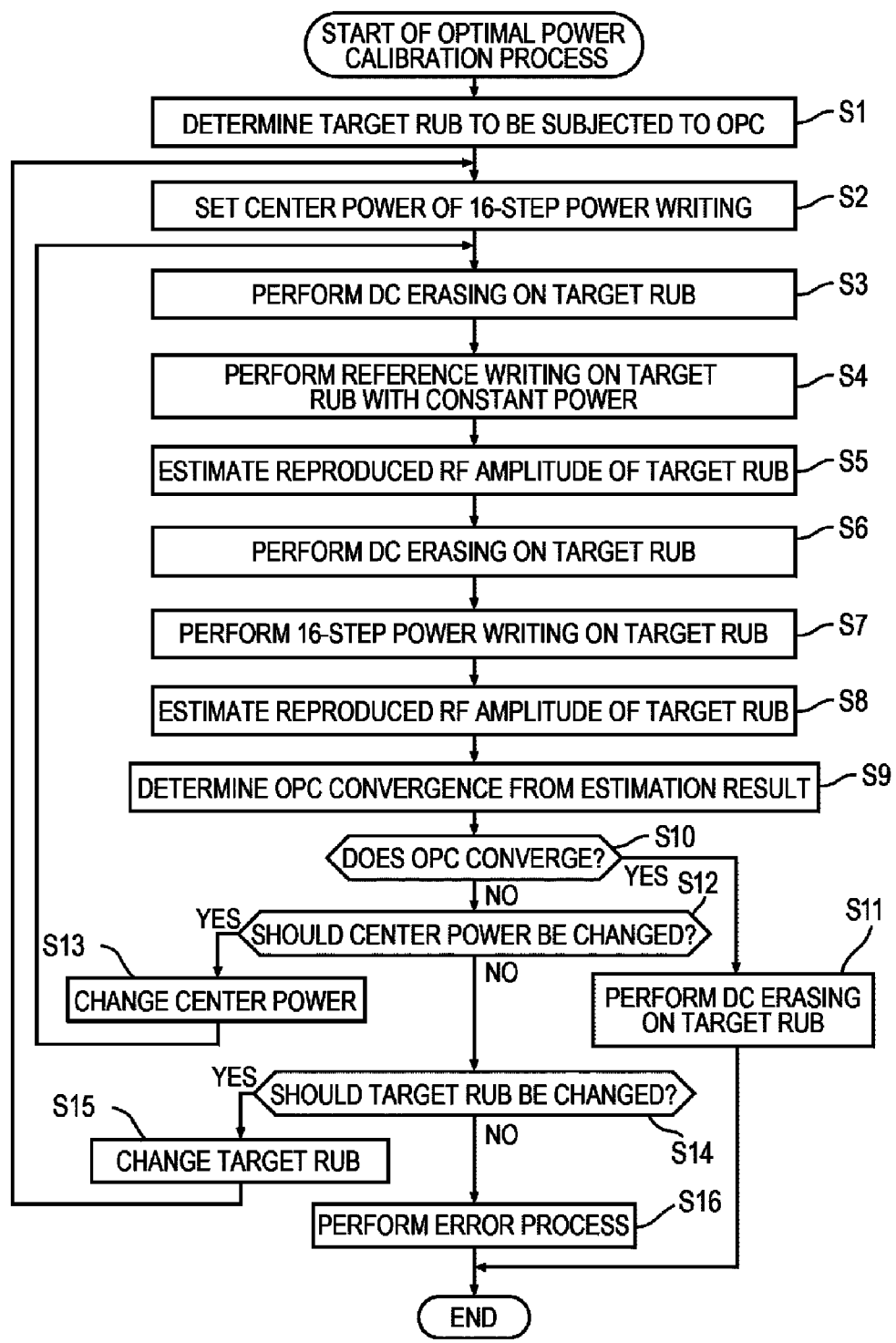
FIG. 1 is a flowchart illustrating a flow of a basic optimal power calibration process.

FIG. 1 is a flowchart illustrating an example of a basic flow of an optimal power calibration process.

When the OPC process is started, the recording and reproducing apparatus randomly determines a recording unit block (RUB) to be subjected to the OPC from a predetermined OPC area in step S1. In step S2, the recording and reproducing apparatus sets a level of center power (P0) in a 16-step power writing process of the OPC process to be described later.

Figure 2:
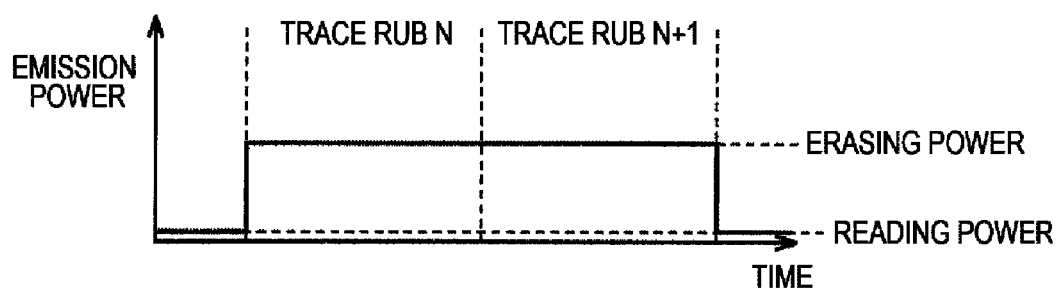
FIG. 2 is a diagram schematically illustrating a DC erasing operation of a simple erasing type.

In step S3, the recording and reproducing apparatus performs a simple DC erasing operation on the target RUB determined in step S1. At this time, the recording and reproducing apparatus performs the erasing operation by emitting a laser beam with constant power (erasing power) to the optical disc (target RUB), as shown in FIG. 2. The magnitude of the erasing power depends on the medium (optical disc). Basically, as the magnitude of the erasing power increases, the erasing remnants (antecedents) of information decreases and the unevenness of the OPC convergent value tends to decrease. In other words, when the magnitude of the erasing power is small, the unevenness of the OPC convergent value tends to increase. Accordingly, in this case, the erasing power has a relatively high value. However, as the magnitude of the erasing power increases, damage applied to a recording layer of the medium (optical disc) increases.

The DC erasing power (erasing power) Pe is calculated (Pp×Pe/Pp), for example, using the optical peak power Pp for a writing operation and a ratio (Pe/Pp) of the erasing power Pe to the peak power Pp, which are described in disc information (DI) of the specification of the optical disc.

Figure 3A:
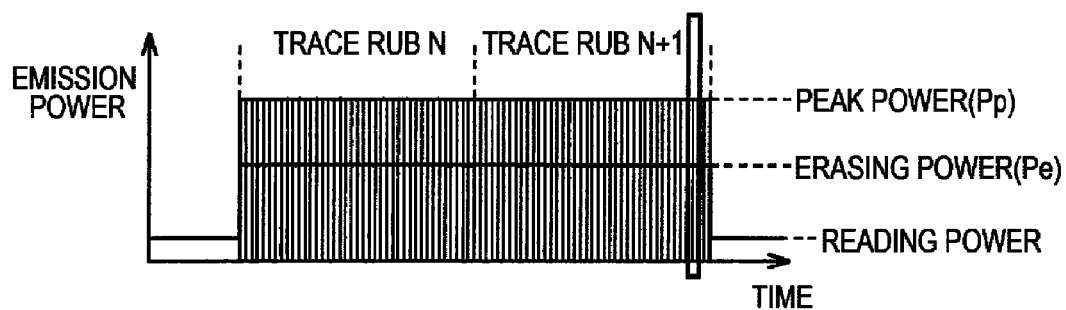
FIGS. 3A and 3B are diagrams schematically illustrating a reference writing operation.
Figure 3B:
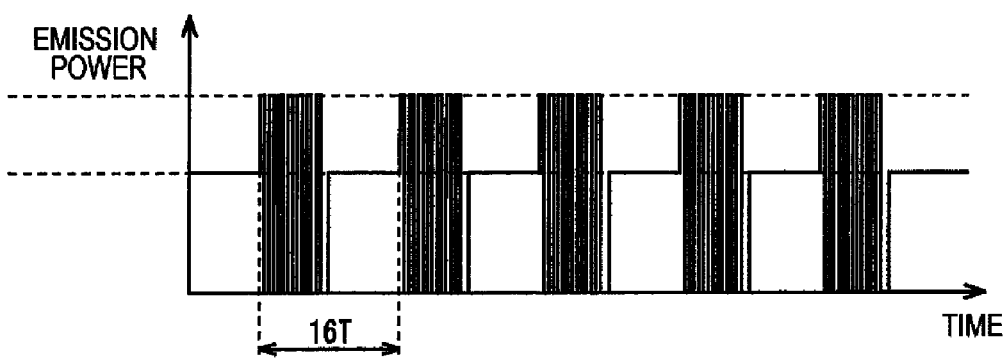

In step S4, the recording and reproducing apparatus performs a writing operation (reference writing) on the target RUB with a constant peak power. For example, as shown in FIG. 3A, the recording and reproducing apparatus writes a predetermined information pattern (signal waveform) keeping the peak power constant to the target RUB. FIG. 3B is an enlarged view of a part (part inside the right rectangle in FIG. 3A) of a waveform shown in FIG. 3A. The recording and reproducing apparatus repeatedly writes an information pattern having 16T (where T is a unit time) as one period, for example, as shown in FIG. 3B.

The recording and reproducing apparatus sets P0×ρ as the peak power and sets a value described in the DI of the specification of the optical disc as the ratio Pe/Pp for writing, for example, using parameter ρ which is a parameter of the OPC. The parameter ρ represents a ratio of the optimal peak power Pwo and the target value Ptarget of the OPC convergent value. Specifically, the optimal peak power Pwo can be expressed by Expression 1 using the parameter ρ and the target value Ptarget of the OPC convergent value.

$$Pwo = \rho \times Ptarget \qquad \text{Expression 1}$$

Figure 4A:
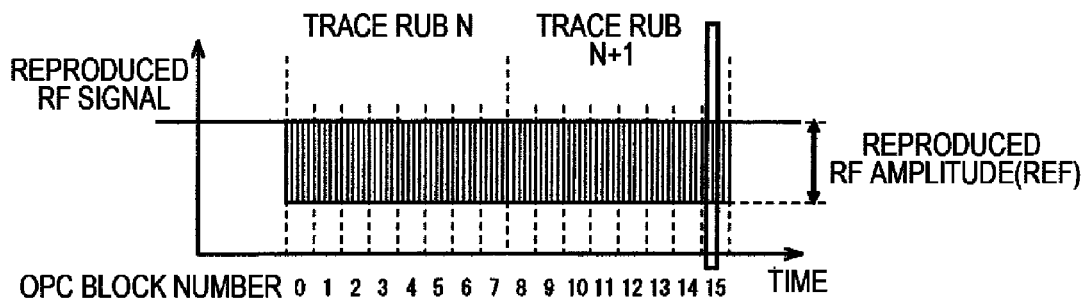
FIGS. 4A and 4B are diagrams schematically illustrating a reproduced RF amplitude estimating operation.
Figure 4B:
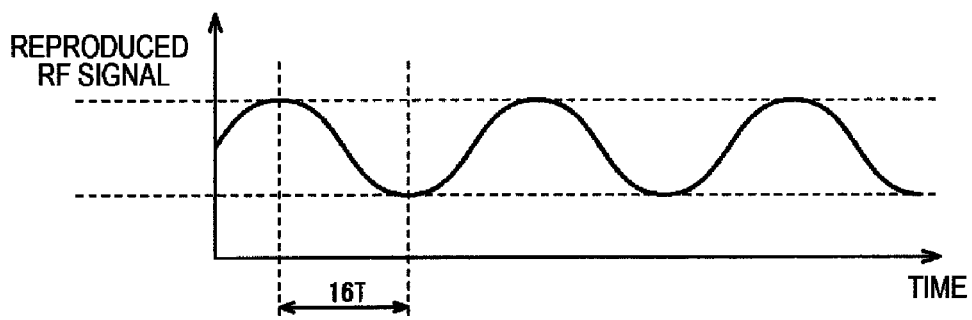

In step S5, the recording and reproducing apparatus reads reproduced RF amplitudes (REF) for the reference writing operation from the optical disc (target RUB) and estimates the read reproduced RF amplitude. FIG. 4A is a diagram illustrating an example of the reproduced RF amplitudes read from the optical disc and FIG. 4B is an enlarged view of a part (part inside the right rectangle in FIG. 4A) of a waveform shown in FIG. 4A. As shown in FIG. 4B, an information pattern including 16T written by the reference writing operation as one period is detected as a waveform such as a sine wave. The detection of the reproduced RF amplitudes (REF) (REF0 to REF15) is performed every area (OPC block) obtained by dividing two target RUBs into sixteen areas in accordance with a 16-step power writing operation to be described later as shown in FIG. 4A. Since the peak power is constant at the time of performing the reference writing operation, the reproduced RF amplitudes (REF0 to REF15) of the reproduced RF signals are usually constant.

Figure 5:
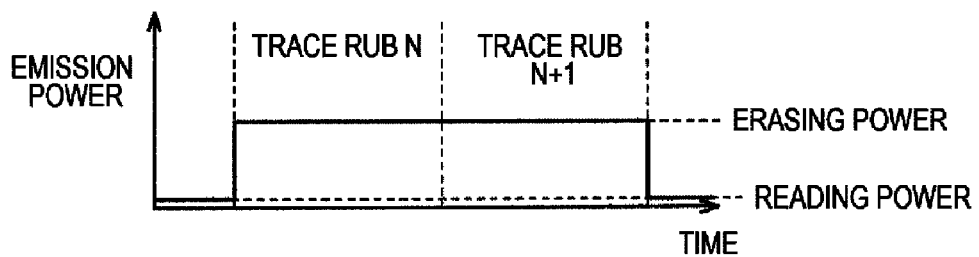
FIG. 5 is a diagram schematically illustrating the DC erasing operation of a simple erasing type.

When the estimation of the reproduced RF amplitude on the reference writing operation is ended, the recording and reproducing apparatus performs a simple DC erasing operation on the target RUB in step S6. The erasing power is the same as step S3 as shown in FIG. 5.

In step S7, the recording and reproducing apparatus performs a 16-step power writing operation of performing a writing operation while changing the peak power by 16 steps about the center power P0 on the target RUB.

Figure 6A:
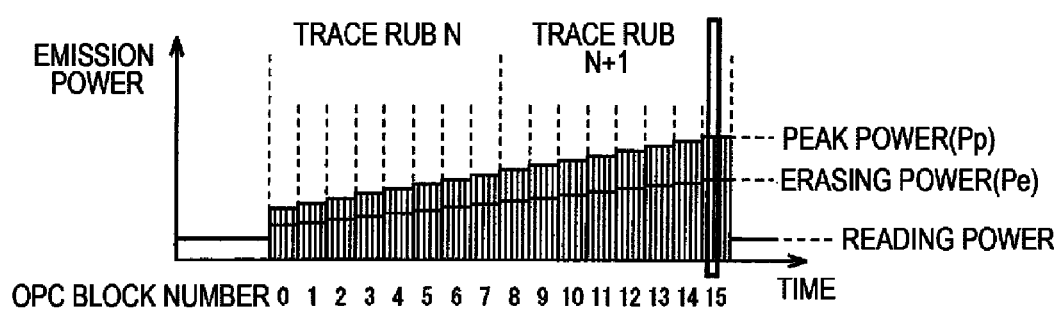
FIGS. 6A and 6B are diagrams schematically illustrating a 16-step power writing operation.
Figure 6B:
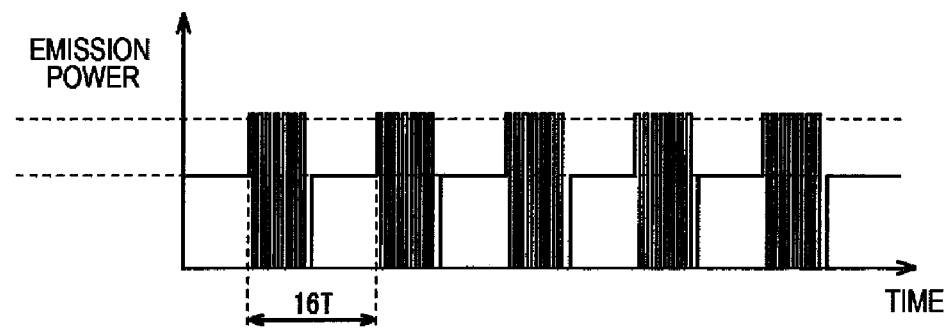

For example, as shown in FIG. 6A, the recording and reproducing apparatus writes a predetermined information pattern (signal waveform) to the target RUB while changing the peak power in a step shape every sixteen OPC blocks. FIG. 6B is an enlarged view of a part (part inside the right rectangle in FIG. 6A) of a waveform shown in FIG. 6A. For example, as shown in FIG. 6B, the recording and reproducing apparatus repeatedly writes the same information pattern including 16T (where T is a unit time) as one period as the reference writing operation.

Figure 7A:
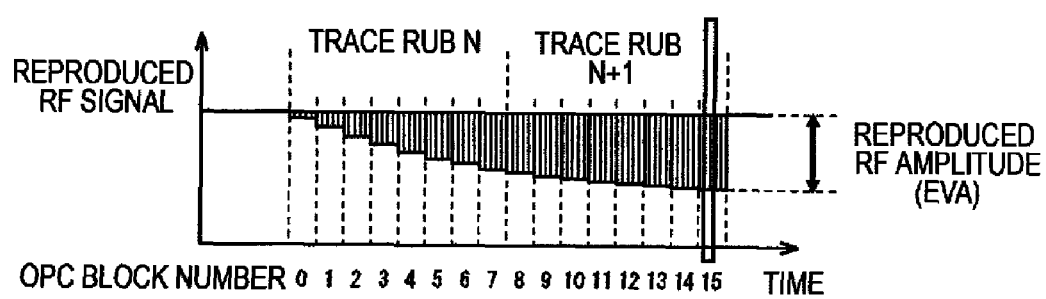
FIGS. 7A and 7B are diagrams schematically illustrating the reproduced RF amplitude estimating operation.
Figure 7B:
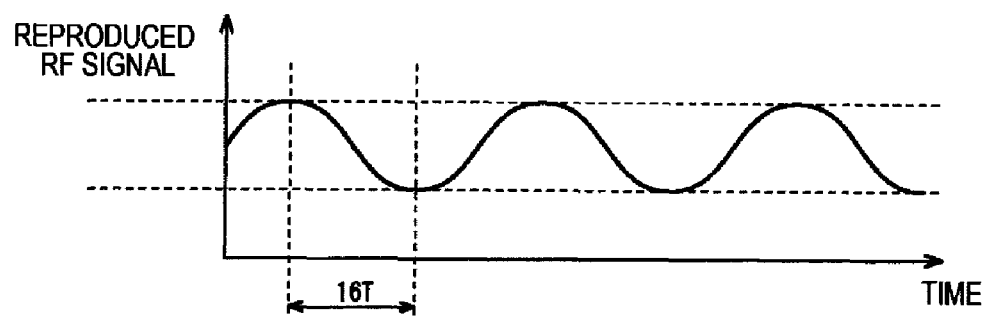

In step S8, the recording and reproducing apparatus reads the reproduced RF amplitude (EVA) of the 16-step power writing operation from the optical disc (target RUB) and estimates the read reproduced RF amplitude. FIG. 7A is a diagram illustrating an example of the reproduced RF amplitude read from the optical disc and FIG. 7B is an enlarged view of a part (part inside the right rectangle in FIG. 7A) of a waveform shown in FIG. 7A. As shown in FIG. 7B, an information pattern including 16T as one period and being written by the 16-step power writing operation is detected as a waveform such as a sine wave. As shown in FIG. 7A, the estimation of the reproduced RF amplitude (EVA) is performed every OPC block (EVA0 to EVA15). Since the peak power is changed every OPC block at the time of performing the 16-step power writing operation, the reproduced RF amplitudes (EVA0 to EVA15) of the reproduced RF signals usually take different values.

When the estimation of the reproduced RF amplitude of the 16-step power writing operation is ended, the recording and reproducing apparatus determines the OPC convergence from the estimation result acquired in the processes of steps S5 to S8 in step S9.

In step S10, the recording and reproducing apparatus determines whether the convergence is accomplished on the basis of the determination result. When determining that the convergence is accomplished, the recording and reproducing apparatus performs a simple DC erasing operation on the target RUB in step S11 similarly to steps S3 to S6 and normally ends the optimal power calibration process.

When determining in step S10 that the convergence is not accomplished, the recording and reproducing apparatus determines whether the value of the center power P0 of the 16-step power writing operation should be changed in step S12. When determining that the value should be changed, the recording and reproducing apparatus changes the center power P0 in step S13 and repeatedly performs the process of step S3 and the processes subsequent thereto on the changed center power P0.

When determining in step S12 that the center power should not be changed, the recording and reproducing apparatus determines whether the target RUB should be changed in step S14. When determining that the target RUB should be changed, the recording and reproducing apparatus changes the target RUB in step S15 and repeatedly performs the process of step S2 and the processes subsequent thereto on the changed target RUB.

When determining in step S14 that the target RUB should not be changed, the recording and reproducing apparatus performs an error process in step S16 to notify the non-convergence, and ends the optimal power calibration process as an error.

By performing the above-mentioned basic OPC process, the recording and reproducing apparatus can calibrate the power of a laser beam. As described above, in the basic OPC process, the simple erasing operation is performed in the DC erasing process of erasing the information of the target RUB. In the flowing description, this DC erasing operation is referred to as a simple erasing method.

In the above-mentioned OPC process, the DC erasing process may be performed by first performing a writing operation and then performing an erasing operation, instead of performing the simple erasing operation. In the following description, this DC erasing operation is referred to as a writing erasing method. The OPC process employing this writing erasing method will be described now.

Figure 8:
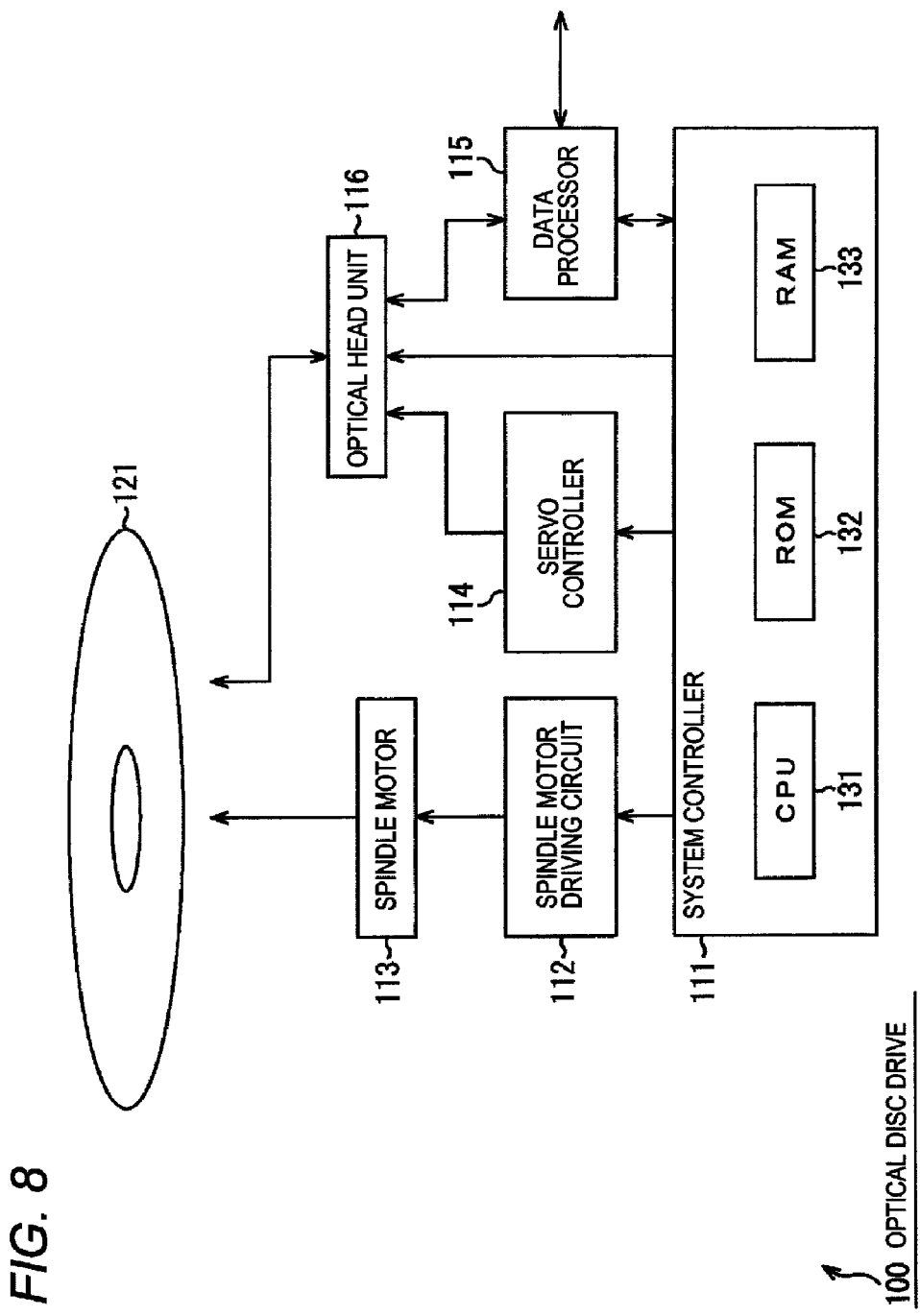
FIG. 8 is a block diagram illustrating a configuration of an optical disc drive to which the invention is applied.

FIG. 8 is a block diagram illustrating a main configuration of an optical disc drive to which the invention is applied.

The optical disc drive 100 shown in FIG. 8 is a device reading or writing information by emitting a laser beam to an optical disc 121 loaded at a predetermined position. The optical disc 121 is a writable (additionally-writable or rewritable) optical disc. An example of the optical disc 121 includes a CD-R (Compact Disc-Recordable), a CD-RW (Compact Disc-Rewritable), a DVD±R (Digital Versatile Disc±Recordable), or a DVD±RW (Digital Versatile Disc±Rewritable). The example can further include a DVD-RAM (Digital Versatile Disc-Random Access Memory), a BD-R (Blu-ray Disc-Recordable), or a BD-RE (Blu-ray Disc-Rewritable). In case of the optical disc drive 100, optical discs (recording mediums) other than the above-mentioned examples may be employed.

The optical disc drive 100 includes a system controller 111, a spindle motor driving circuit 112, a spindle motor 113, a servo controller 114, a data processor 115, and an optical head unit 116.

The system controller 111 is a control unit controlling operations of the units of the optical disc drive 100. The system controller 111 includes a central processing unit (CPU) 131, a read only memory (ROM) 132, and a random access memory (RAM) 133. By allowing the CPU 131 to perform various processes in accordance with programs stored in the ROM 132 or programs loaded to the RAM 133, the CPU serves as the system controller 111. The RAM 133 properly stores data necessary for allowing the CPU 131 to perform various processes. The operations of the system controller 111 described below correspond to operations which the CPU 131 performs using the ROM 132 or the RAM 133.

The spindle motor driving circuit 112 controls the rotation of the spindle motor 113 allowing the optical disk 121 to rotate under the control of the system controller 111. The servo controller 114 controls the position of an optical pickup (the optical head unit 116) under the control of the system controller 111. The data processor 115 performs an information process on information read from the optical disc 121 or information written to the optical disc 121 under the control of the system controller 111. The optical head unit 116 emits a laser beam to the optical disc 121 to read or write information under the control of the system controller 111.

For example, the optical head unit 116 converts digital data acquired from the data processor 115 from electrical signals to optical signals (laser beam) and writes the digital data to the optical disc 121 by emitting the laser beam to the optical disc 121 while changing the output level of the laser beam to one of the cooling power (cool output level) which is emission power for cooling the surface of the optical disc, the erasing power (erasing output level) which is emission power for erasing information recorded in the optical disc, and the peak power (peak output level) which is emission power for writing information to the optical disc. The optical head unit 116 extracts the digital data recorded in the optical disc 121 as optical signals by emitting a laser beam to the optical disc 121 with the reading power (reading output level) which is emission power for reading information recorded in the optical disc, converts the extracted optical signals into electrical signals, and supplies the electrical signals to the data processor 115.

The optical disc drive 100 performs a calibration process (optimal power calibration (OPC) process) so as to optimize the emission power of the laser beam for writing before performing the writing process. The OPC control is performed by the system controller 111.

The setting of the power (such as the peak power, the erasing power, and the cooling power) necessary for performing the OPC process is carried out on the optical head unit 116 by the system controller 111. A recording start time necessary for performing the OPC process, a power changing time of EVA writing (step writing), and writing data are supplied from the data processor 115. The writing data corresponds to signals actually written to a disc, pass through a writing strategy circuit (WS) not shown, are converted into ON/OFF signals of peak, erasing, and cooling channels of an LDD (Laser Diode Driver) controlling the output of the laser beam in the optical head unit 116, and are then supplied. The system controller 111 performs necessary settings for allowing the data processor 115 to perform various operation modes at proper times.

The system controller 111 also performs necessary settings for allowing the servo controller 114 and the spindle motor driving circuit 112 to perform various operation modes at proper times and comprehensively controls the entire operations of the optical disc drive 100.

A function, which is used to perform the OPC process, of estimating amplitudes of reproduced RF signals is mounted on the data processor 115. The system controller 111 receives the times from the data processor 115 and controls the units to acquire the estimated amplitude data at proper times. The system controller 111 processes the acquired data and controls the entire sequences of the OPC process such as determination on the OPC convergence or calculation of convergent values.

An example of a flow of the OPC process employing the writing erasing method, which is performed by the system controller 111, will be described now with reference to the flowchart shown in FIG. 9.

When the OPC process is started, the system controller 111 randomly determines two RUBs to be subjected to the OPC process from a predetermined OPC area in step S101 (RUB N and RUB N+1). The OPC area is previously determined in the specification of an optical disc standard, like 2048 RUBs from the innermost circumference of the optical disc 121. The equal result is basically obtained even what RUB in the OPC area is used to perform the OPC. The system controller 111 randomly determines a target RUB without any bias so as to avoid a use of an improper RUB to perform the OPC process, for example, with any defect (scratches or other defects). The system controller 111 may determine the target RUB in accordance with a predetermined rule.

In step S102, the system controller 111 sets the level of the center power P0 of the 16-step power writing process of the OPC process to be described later. For example, the value of the center power P0 is recorded in the ROM 132 or the data processor 115 or included in the data loaded to the RAM 133. The system controller 111 acquires the value from the ROM 132, the RAM 133, or the data processor 115 and sets the acquired value as the level of the center power P0 of the 16-step power writing process. The set value is stored in, for example, the RAM 133 and is used to allow the system controller 111 to control the optical head unit 116 and the like. The value set as the value of the center power P0 of the 16-step power writing process may be supplied to and stored in the optical head unit 116 and may then be properly used in the operation of the optical head unit 116.

In step S103, the system controller 111 performs a DC erasing process the target RUB determined in step S101 using the writing erasing method. The details of the DC erasing process using the writing erasing method will be described later and is an operation of first performing a writing operation and then performing an erasing operation.

When the DC erasing process using the writing erasing method is ended, the system controller 111 controls the units such as the optical head unit 116 in step S104 to perform a reference writing operation of writing data with a constant peak power on the target RUB determined in step S101. In step S105, the system controller 111 reads and estimates the reproduced RF amplitude (REF) based on the reference writing operation from the optical disc (target RUB) using the amplitude estimating function mounted on the data processor 115 and acquires the estimated value. That is, the system controller 111 reads estimation information written by the reference writing operation and estimates the acquired reproduced signals.

When the estimating of the reproduced RF amplitude based on the reference writing operation is ended, the system controller 111 performs the DC erasing process on the target RUB using the writing erasing method in step S106. The DC erasing process using the writing erasing method is the same as step S103.

When the DC erasing process using the writing erasing method is ended, the system controller 111 controls the units such as the optical head unit 116 in step S107 to perform the 16-step power writing process of performing a writing operation while changing the peak power in 16 steps about the center power P0 set in step S102 on the target RUB determined in step S101. In step S108, the system controller 111 reads and estimates the reproduced RF amplitude (REF) based on the 16-step power writing process from the optical disc (target RUB) using the amplitude estimating function mounted on the data processor 115 and acquires the estimated value. That is, the system controller 111 reads the estimation information written in the 16-step power writing process and estimates the acquired reproduced signals.

When the estimation of the reproduced RF amplitude based on the 16-step power writing process is ended, the system controller 111 determines the OPC convergence in step S109 from the estimation result acquired by the processes of steps S105 and S108.

In step S110, the system controller 111 determines whether the OPC convergence occurs on the basis of the determination result. When determining that the OPC convergence occurs, the system controller performs the DC erasing process using the writing erasing method on the target RUB in step S111, similarly to steps S103 and S106, and then normally ends the OPC process.

When determining in step S110 that the OPC convergence does not occur, the system controller 111 determines whether the value of the center power P0 of the 16-step power writing process should be changed in step S112. When the center power P0 is excessively great or small in comparison with the characteristic of the optical disc 121 loaded to the optical disc drive 100, the unevenness of the RF amplitudes may increase to make the OPC convergence difficult. In this case, the system controller 111 can make the OPC convergence easy by shifting the value of the center power P0 to a greater value or a smaller value.

For this purpose, when determining that the value of the center power P0 should be changed, the system controller 111 shifts the value of the center power P0 to a greater or smaller value by a predetermined value in step S113 and repeatedly performs the process of step S103 and the processes of steps subsequent thereto on the new center power P0.

When determining in step S112 that the OPC convergence does not occur even by repeating the processes of steps S103 to S113 to change the center power P0 more (the center power is not changed any more), the system controller 111 determines whether the target RUB should be changed in step S114. For example, when any defect (scratches or other defects) exists in the RUB selected as the target RUB, the OPC convergence may not occur even by repeating the OPC process while changing the center power P0 (the RUB may not often converge). In this case, the system controller 111 changes the target RUB and performs the OPC process on the new RUB again.

That is, when determining that the target RUB should be changed in step S114, the system controller 111 changes the target RUB in step S115 and repeatedly performs the process of step S102 and the processes of steps subsequent thereto on the new target RUB.

When determining in step S114 that the OPC convergence does not occur (the target RUB should not be changed any more) even by repeatedly performing the processes of steps S102 to S115 to change the target RUB, the system controller 111 performs an error process in step S116 to notify that the OPC convergence does not occur and ends the OPC process as an error.

As described above, by performing the OPC process using the writing erasing method, the system controller 111 can calibrate the power of a laser beam to more easily improve the stability of the OPC convergent value.

An example of a flow of the DC erasing process performed in steps S103, S106, and S111 of FIG. 9 will be described now with reference to the flowchart shown in FIG. 10.

When the DC erasing process is started, the system controller 111 controls the units such as the optical head unit 116 in step S131 to write a predetermined pattern to the target RUB with predetermined peak power. In step S132, the system controller 111 controls the units such as the optical head unit 116 to perform the DC erasing process on the target RUB processed in step S131 with low power determined depending on the medium type.

As described above, the system controller 111 writes predetermined information to the target RUB and performs an erasing operation on the target RUB without estimating the reproduced signal of the written information. That is, the system controller 111 continuously writes and erases predetermined information to and from the target RUB.

Figure 9:
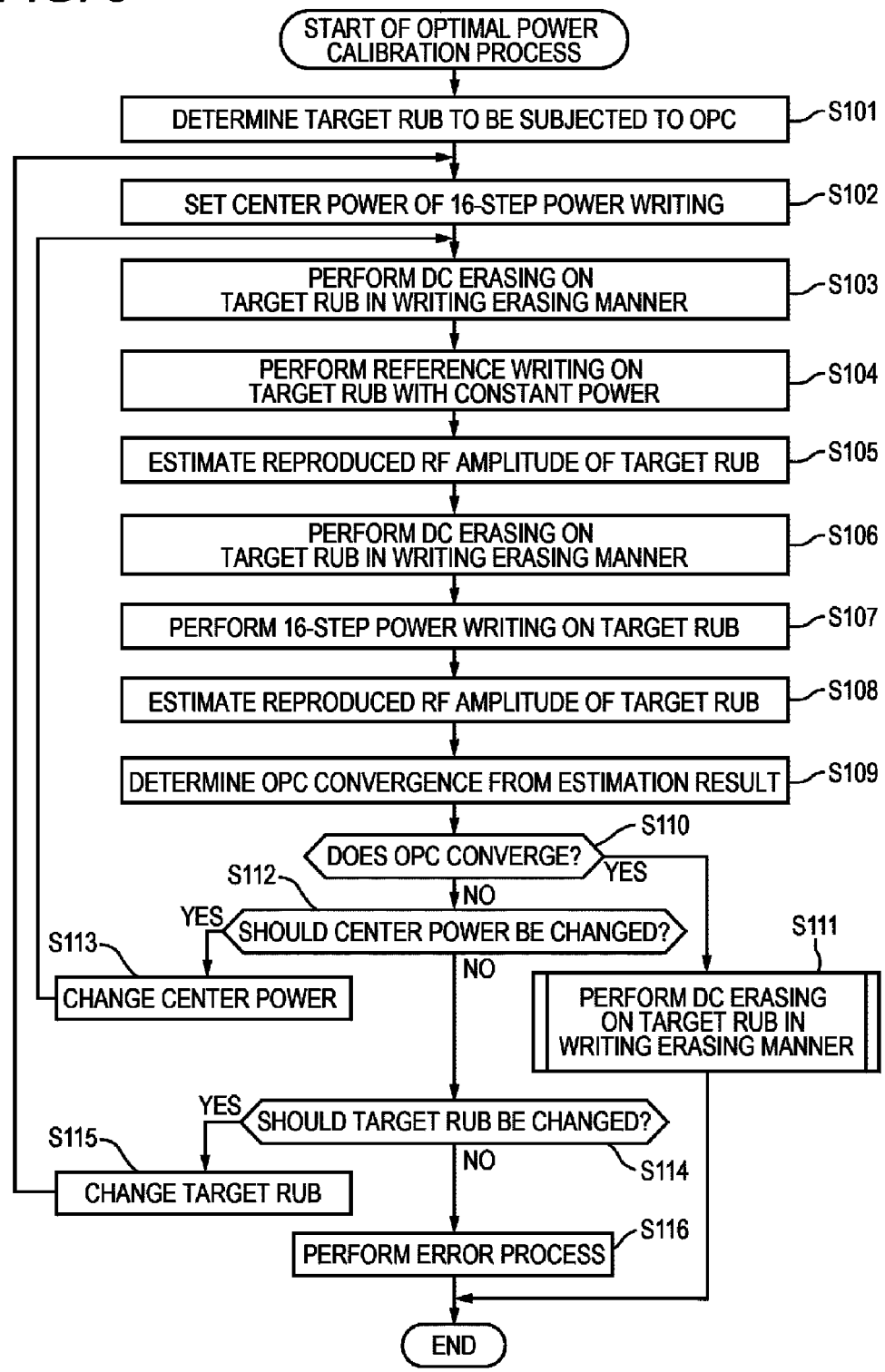
FIG. 9 is a flowchart illustrating a flow of an optimal power calibration process.

When the process of step S132 is ended, the system controller 111 ends the DC erasing process and performs the subsequent processes in step S103, S106, or step S111 (the step of starting the DE erasing process) of FIG. 9.

As described above, by first performing a writing operation and then performing an erasing operation at the time of performing the DC erasing process of the OPC process, the system controller 111 can more easily improve the stability of the OPC convergent value. Since the erasing operation can be performed with the power lower than that of the simple erasing method at the time of performing the erasing operation in step S132, the system controller 111 can suppress the deterioration of the recording layer of the medium (the optical disc 121) due to the OPC process. Particularly, when the OPC process is performed repeatedly, it is possible to obtain a greater advantage.

The operations of the OPC process employing the DC erasing process using the writing erasing method will be described in more detail now.

Figure 10:
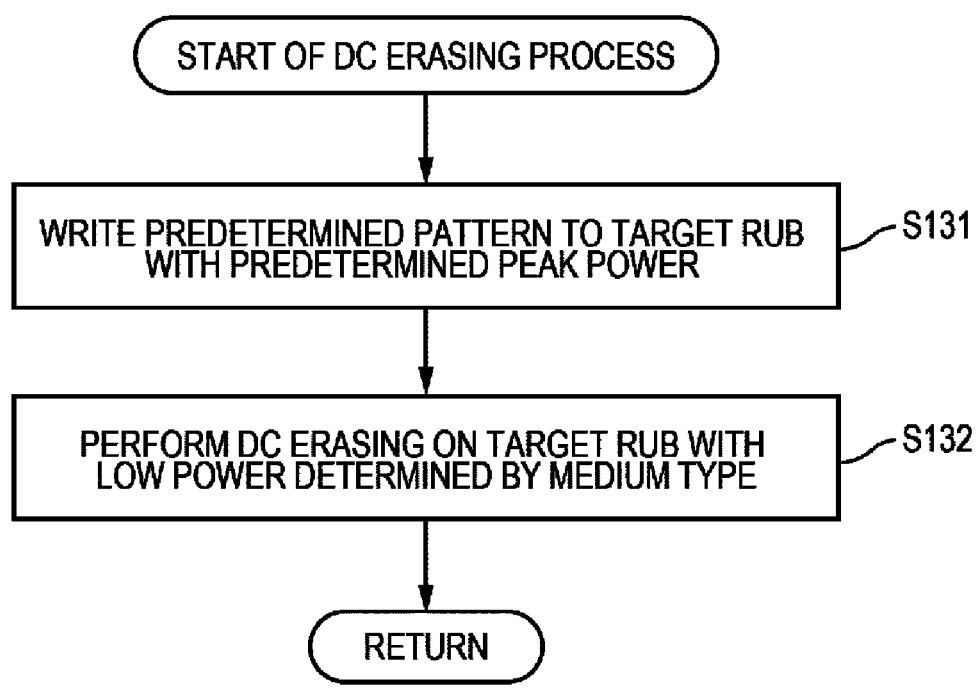
FIG. 10 is a flowchart illustrating a flow of a DC erasing process.
Figure 11A:
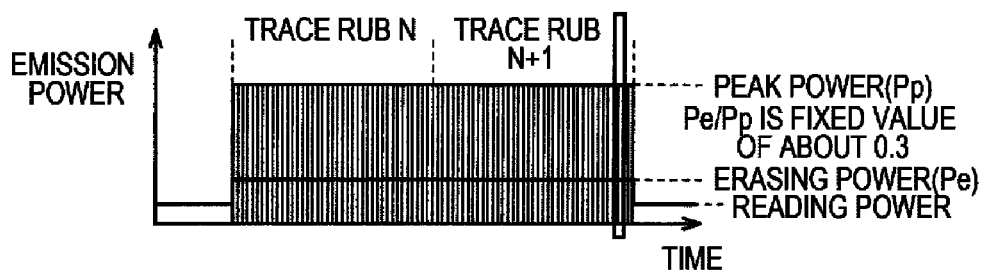
FIGS. 11A, 11B, and 11C are diagrams schematically illustrating a DC erasing operation of a writing erasing type.
Figure 11B:
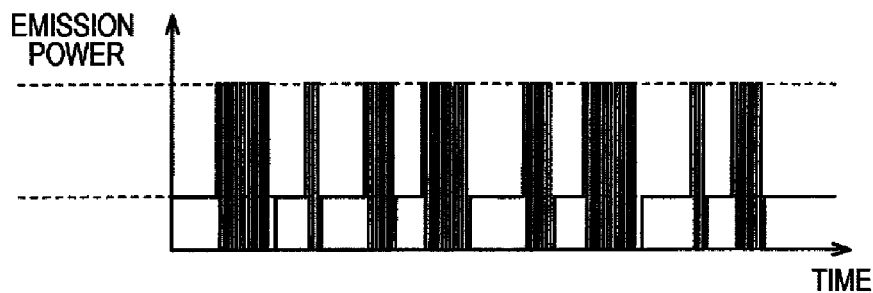

As described above, in step S103 of FIG. 9, the system controller 111 performs the DC erasing process using the writing erasing method as shown in FIG. 10. The system controller 111 which has started the DC erasing process first writes a predetermined information pattern (signal waveform) with constant peak power on the target RUB, for example, as shown in FIG. 11A, in step S131 of FIG. 10. FIG. 11B is an enlarged view of a part (part in the right rectangle of FIG. 11A) of the waveform shown in FIG. 11A. For example, as shown in FIG. 11B, the system controller 111 writes an information pattern (so-called random pattern) in which various Ts are randomly repeated, similarly to the information pattern generated in the normal writing operation.

This information pattern is arbitrary and may be the same as the information pattern of the reference writing process or the 16-step power writing process.

For example, the optimal writing peak power Pp for recording described in the DI (Disc Information) of the standard specification of the optical disc 121 is used as the writing peak power at that time. The ratio Pe/Pp is set to a fixed value of about 0.3 in common with all the mediums.

Figure 11C:
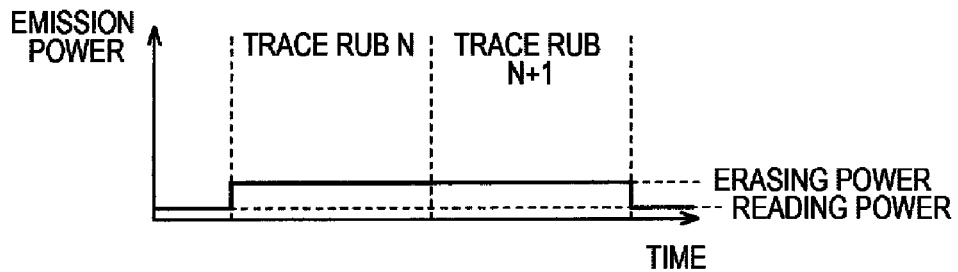

After the writing operation, the system controller 111 performs an erasing operation on the target RUB in step S132 of FIG. 10 as shown in FIG. 11C. The level of the erasing power Pe at this time is not limited as long as it can erase marks of the above-mentioned information pattern (for example, the random pattern), is a fixed value determined depending on the medium type, and may be a value lower than that of the simple DC erasing method. For example, plural fixed values may be prepared as follows and the system controller 111 may select one from the fixed values depending on the medium type:

(A) Single layer disc (SL disc):Pe=2.0 (mW);
(B) Layer L0 of double layer disc (DL disc):Pe=4.0 (mW); and
(C) Layer L1 of double layer disc (DL disc):Pe=3.5 (mW)

As described above, the system controller 111 can satisfactorily perform the erasing operation with the power lower than that of the simple erasing method.

Figure 12A:
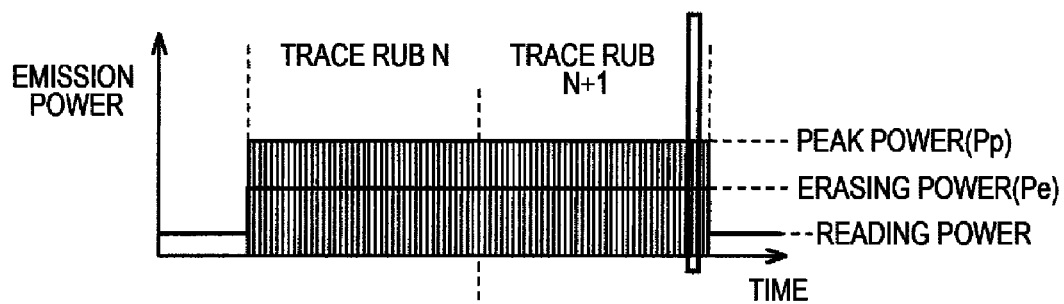
FIGS. 12A and 12B are diagrams schematically illustrating a reference writing operation.
Figure 12B:
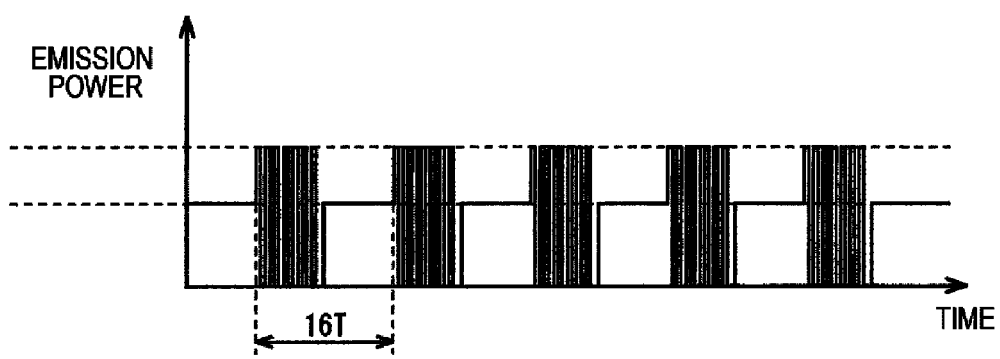

In step S104 of FIG. 9, the system controller 111 writes the predetermined information pattern (signal waveform) with constant peak power on the target RUB as the reference writing operation, for example, as shown in FIG. 12A. FIG. 12B is an enlarged view of a part (part shown in the right rectangle of FIG. 12A) of the waveform shown in FIG. 12A. For example, as shown in FIG. 3B, the system controller 111 repeatedly writes the information pattern (so-called 8T monotone pattern) in which 16Ts (where T is a unit time) are included in one period and a pulse wave is repeated in 8T out of 16T.

As the peak power at this time, the maximum value of the peak power of the 16-step power writing process is set. The value described in the DI of the specification is used as the ratio Pe/Pp.

Figure 13A:
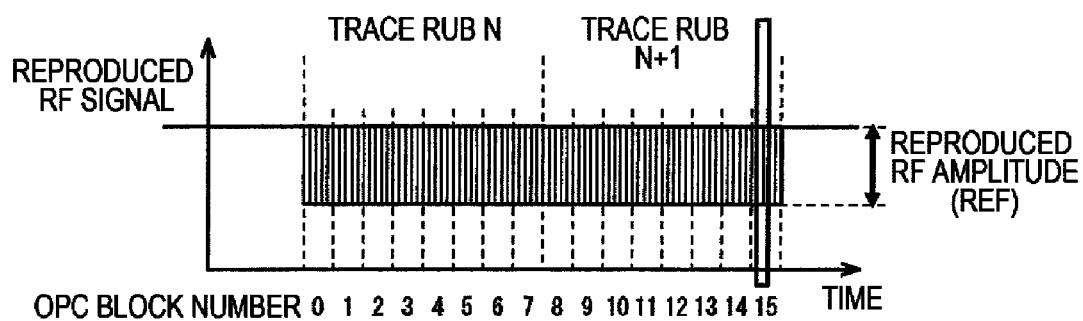
FIGS. 13A and 13B are diagrams schematically illustrating the reproduced RF amplitude estimating operation.
Figure 13B:
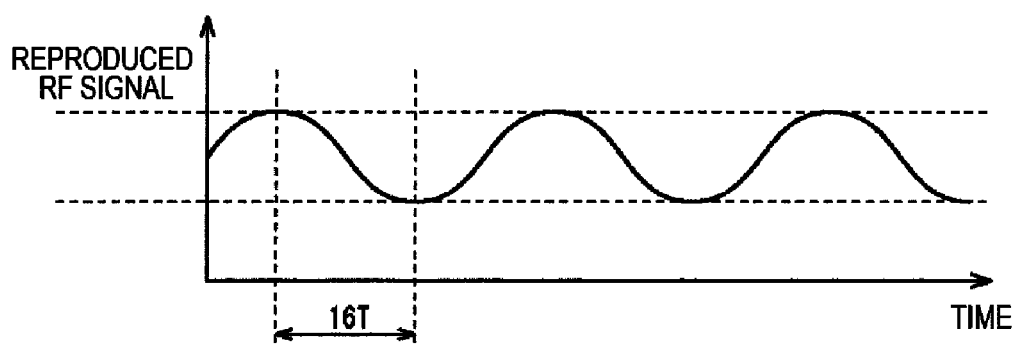

As shown in FIG. 13A, the system controller 111 reads and estimates the reproduced RF amplitude (REF) based on the reference writing operation from the optical disk (target RUB) in step S105 of FIG. 9. FIG. 13B is an enlarged view of a part (part shown in the right rectangle of FIG. 13A) of the waveform shown in FIG. 13A. As shown in FIG. 13B, the information pattern, which is written in the reference writing operation, including 16Ts in one period is detected as a waveform such as a sine wave. As shown in FIG. 13A, the detection of the reproduced RF amplitude (REF) is performed every area (OPC block) obtained by dividing two target RUBs into 16 areas (REF0 to REF15) in accordance with the 16-step power writing process to be described later. Since the peak power is constant at the time of performing the reference writing operation, the reproduced RF amplitudes (REF0 to REF15) are usually constant.

Figure 14A:
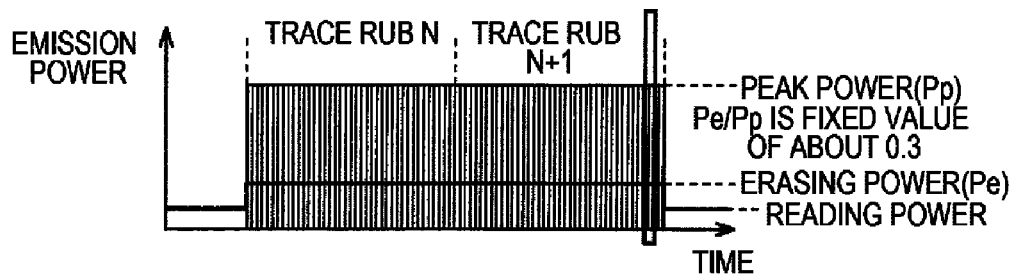
FIGS. 14A, 14B, and 14C are diagrams schematically illustrating the DC erasing operation of a writing erasing type.
Figure 14B:
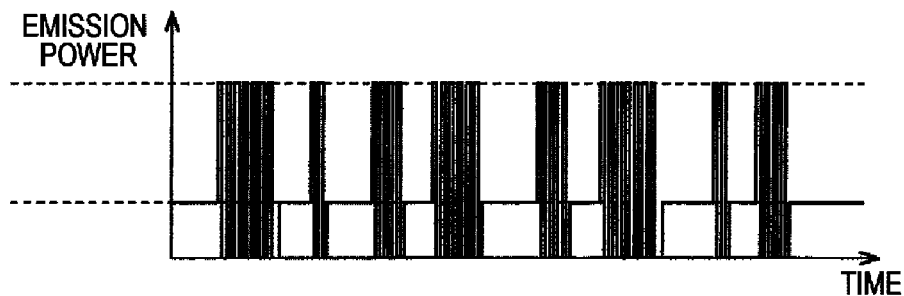
Figure 14C:
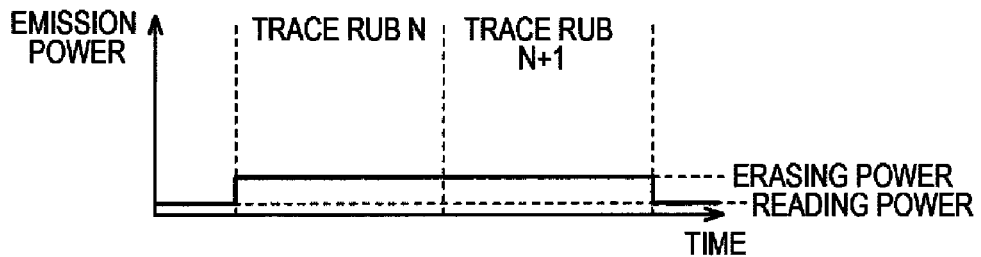

When the estimation of the reproduced RF amplitudes based on the reference writing operation is ended, the system controller 111 performs the DC erasing process on the target RUB using the writing erasing operation in step S106 of FIG. 9. The erasing power at this time is the same as step S103 as shown in FIGS. 14A, 14B, and 14C.

Figure 15A:
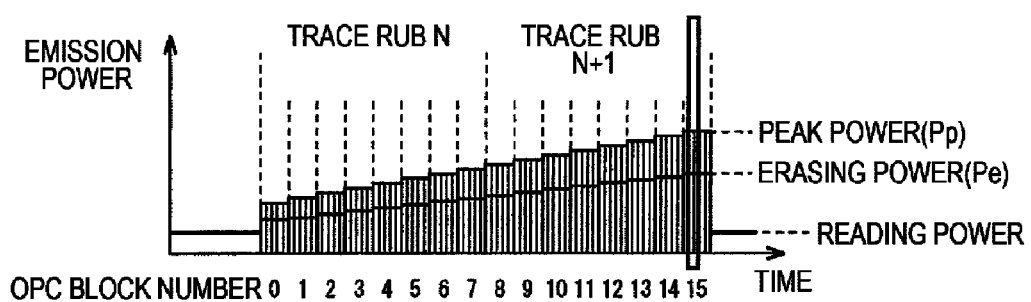
FIGS. 15A and 15B are diagrams schematically illustrating a 16-step power writing operation.
Figure 15B:
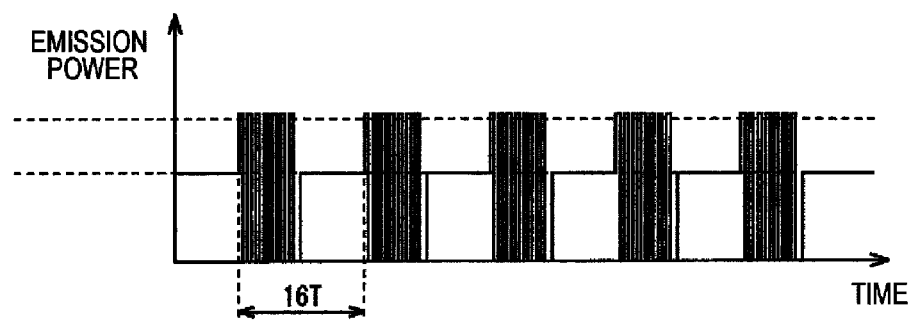

In step S107 of FIG. 9, the system controller 111 writes a predetermined information pattern (signal waveform) on the target RUB while changing the peak power in a 16 step shape about the center power P0 every OPC block, for example, as shown in FIG. 15A. The value described in the DI of the specification is used as the ratio Pe/Pp. FIG. 15B is an enlarged view of a part (part shown in the right rectangle of FIG. 15A) of the waveform shown in FIG. 15A. For example, as shown in FIG. 15B, the recording and reproducing apparatus repeatedly writes the same information pattern (so-called 8T monotone pattern) including 16Ts (where T is a unit time) in one period as the reference writing operation.

Figure 16A:
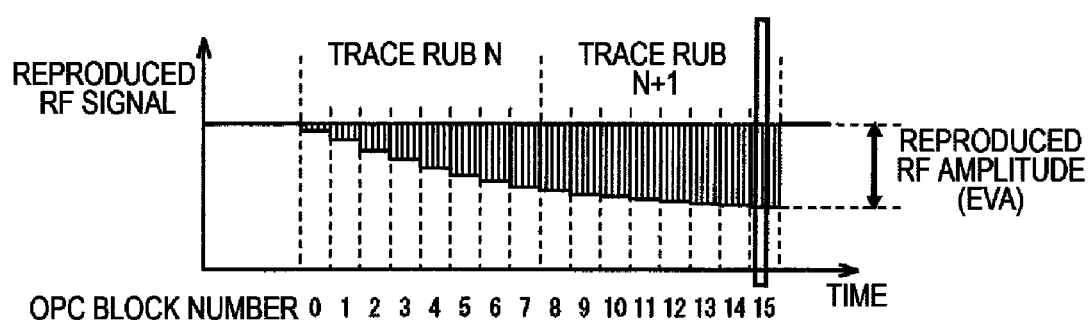
FIGS. 16A and 16B are diagrams schematically illustrating the reproduced RF amplitude estimating operation.
Figure 16B:
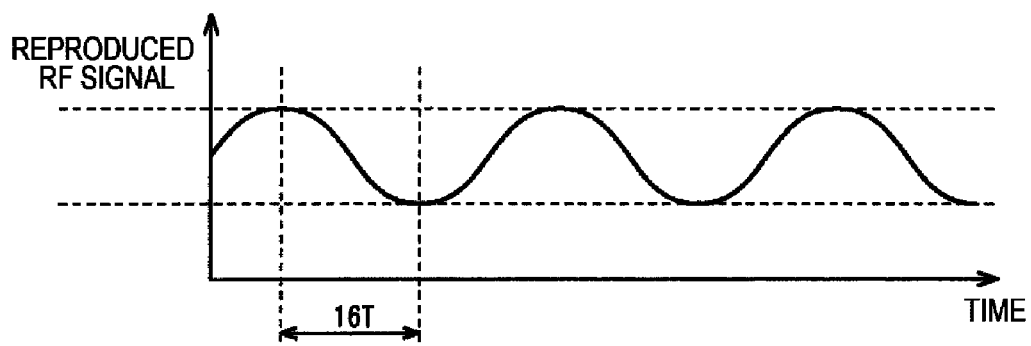

In step S108 of FIG. 9, the system controller 111 reads and estimates the reproduced RF amplitudes (EVA) based on the 16-step power writing process from the optical disc (target RUB). FIG. 16A is a diagram illustrating an example of the reproduced RF amplitudes read from the optical disc and FIG. 16B is an enlarged view of a part (part in the right rectangle of FIG. 16A) of the waveform shown in FIG. 16A. As shown in FIG. 16B, the information pattern including 16Ts in one period written in the 16-step power writing process is detected as a waveform such as a sine wave. As shown in FIG. 16A, the estimation of the reproduced RF amplitudes (EVA) is performed every OPC block (EVA0 to EVA15). Since the peak power of the 16-step power writing process is changed every OPC block, the reproduced RF amplitudes (EVA0 to EVA15) of the reproduced RF signals usually have different values.

The estimation result of the basic OPC process using the simple erasing method and the OPC process using the writing erasing method will be described now.

FIGS. 17A to 22B show comparison examples of the actual estimation results of the basic OPC process using the simple erasing method and the OPC process using the writing erasing method on layer L1 of a double-layered optical disc (dual layer (DL)) at 2.4 times speed. The setting of power in the OPC process using the writing erasing method is performed as follows.

The peak power Pp at the time of performing a writing operation is set to 11.8 mW using the optimal writing value of Dibank. The ratio Pe/Pp is set to 0.3 in common with all the mediums. The average power level is equal to or set around that of the usual writing operation.

The erasing power (ERACE Pe) at the time of performing the erasing operation is set to 3.5 mW, which is low and is directed to a more advantage than OPCDOW.

The magnification (REFW) of Pp to Pind at the time of performing the reference writing operation (wopcref) is set to 1.225. This is a countermeasure for improving the unevenness in accordance with the maximum power of 16 steps of the EVA writing process (the 16-step power writing process).

In case of the simple erasing method, it is assumed in the following description that the magnification (REFW) of Pp to Pind at the time of performing the reference writing operation (wopcref) is set to 1.5 and the erasing power (ERACE Pe) at the time of performing the erasing operation is set to 3.78 mW.

The writing speed (recording speed) and the reading speed (reproducing speed) of the OPC process are both set to 2.4 times.

Figure 17A:
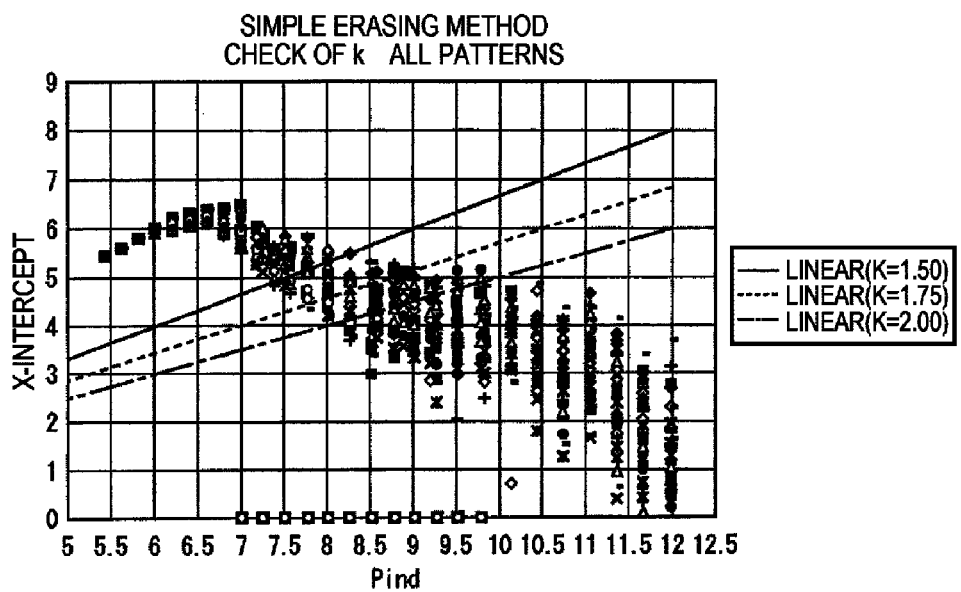
FIGS. 17A and 17B are diagrams illustrating a comparison of PindSCAN estimation.
Figure 17B:
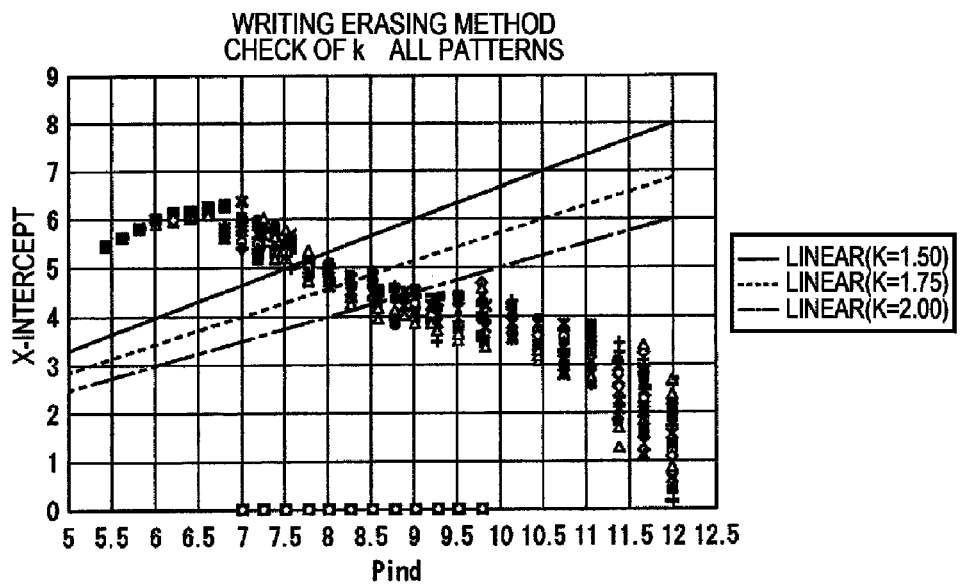

FIGS. 17A and 17B are diagrams for comparison of PindSCAN estimation results. In the PindSCAN, the OPC process is performed in different procedures when the range of the peak power Pfit of the steps in the EVA writing process is low, middle, and high. In the graph shown in FIGS. 17A and 17B, Pthrshold obtained by the calculation of the OPC process is plotted with respect to Pfit, where the horizontal axis (x axis) represents the Pind and the vertical axis (y axis) represents the x-intercept.

Pthrshold represents x coordinates (peak power) of intersections (x-intercepts) of the x axis and tangential lines (tangential lines of a PM curve when the peak power Pp is in the range of Pfit1 to Pfit16) at measurement points of a curve (the PM curve) formed in a PM graph in which the peak power Pp is expressed in the horizontal axis (x axis) and EVA/REF×Pp is expressed in the vertical axis (y axis).

FIG. 17A shows the result of the basic OPC process using the simple erasing method and FIG. 17B shows the result of the OPC process using the writing erasing method.

Three straight lines shown in the graphs of FIGS. 17A and 17B show (Pind)=κ×(x-intercept). The expression for calculating the OPC convergent value Ptarget from two estimation points (Pfit1, Ptar1) and (Pfit2, Ptar2) is obtained as Expression 2.

$$P\text{target}=(P\text{tar2}\times P\text{fit1}-P\text{tar1}\times P\text{fit2})/(P\text{tar2}-P\text{tar1}-P\text{fit2}+P\text{fit1})$$ Expression 2

Expression 2 represents that points in the vicinity of the above-mentioned three straight lines among a group of points plotted in FIGS. 17A and 17B are the OPC convergent points. That is, as the unevenness of the points plotted in the vicinity of the straight lines in FIGS. 17A and 17B becomes smaller, the unevenness of the OPC convergent values becomes smaller and the stability thereof becomes higher.

Comparing FIGS. 17A and 17B, it is clear that the unevenness of the OPC convergent values in FIG. 17B is smaller. That is, the convergent value of the OPC process using the writing erasing method is more stable than that of the basic OPC process using the simple erasing method. In other words, in the OPC process using the writing erasing method, the influence of the recording antecedents is smaller than and the erasing of the OPC recording is clearer (the base of the OPC estimation is more preferable) than those of the basic OPC process using the simple erasing method.

Figure 18A:
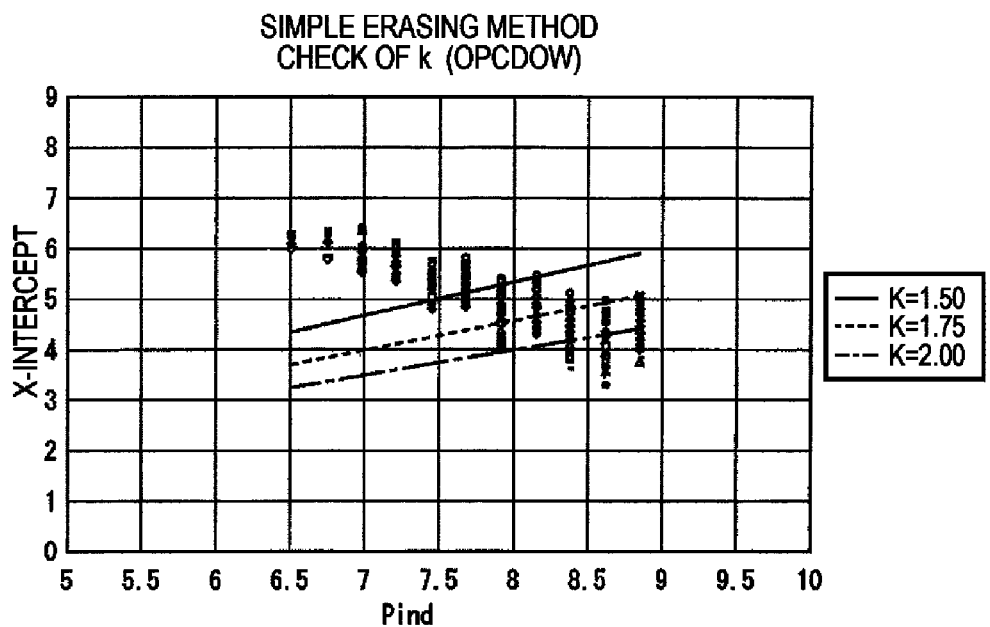
FIGS. 18A and 18B are diagrams illustrating a comparison of OPCDOW200 estimation.
Figure 18B:
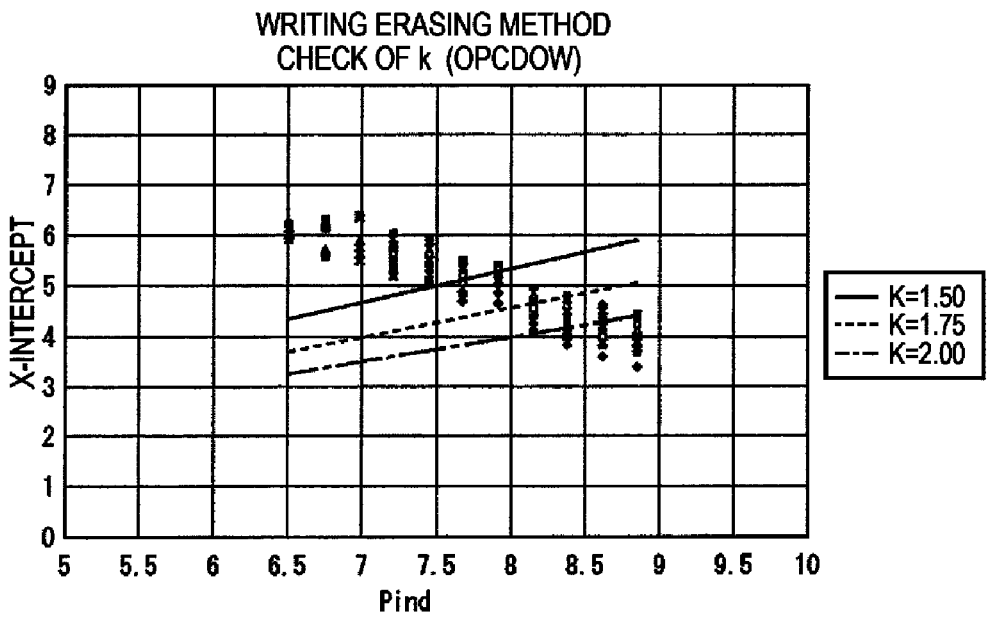

FIGS. 18A and 18B are diagrams for comparison of estimation results of OPCDOW200. The OPCDOW200 is to repeatedly perform the OPC process 200 times when the power range of the Pfit is middle among the above-mentioned three steps. In FIGS. 18A and 18B, the results of Pthrshold obtained by the calculation of the OPC process are plotted with respect to the Pfit. Similarly to FIGS. 17A and 17B, the horizontal axis (x axis) represents the Pind and the vertical axis (y axis) represents the x-intercept. FIG. 18A shows the result of the basic OPC process using the simple erasing method and FIG. 18B shows the result of the OPC process using the writing erasing method.

In FIGS. 18A and 18B, similarly to FIGS. 17A and 17B, points in the vicinity of three straight lines among a group of points plotted in the graphs are the OPC convergent points. That is, as the unevenness of the points plotted in the vicinity of the straight lines in FIGS. 18A and 18B becomes smaller, the unevenness of the OPC convergent values becomes smaller and the stability thereof becomes higher.

Comparing FIGS. 18A and 18B, it is clear that the unevenness of the OPC convergent values in FIG. 18B is the smaller. That is, in the estimation of the OPCDOW, the convergent value of the OPC process using the writing erasing method is more stable than that of the basic OPC process using the simple erasing method.

FIGS. 19A and 19B are diagrams for comparison of trend characteristics of the OPC convergent values. The graphs shown in FIGS. 19A and 19B are obtained by calculating the convergent values with κ=1.5 on the basis of the estimation results shown in FIGS. 18A and 18B and arranging the trend characteristics with respect to the number of OPC processes performed. The horizontal axis (x axis) represents the number of OPC convergent values, that is, the number of OPC processes performed and the vertical axis (y axis) represents the convergent values Ptarget (mW). FIG. 19A shows the result of the basic OPC process using the simple erasing method and FIG. 19B shows the result of the OPC process using the writing erasing method. Of course, as the unevenness of the plotted points becomes smaller, the unevenness of the OPC convergent values becomes smaller and the stability becomes higher.

Comparing FIGS. 19A and 19B, it is clear that the unevenness of the OPC convergent values in FIG. 19B is smaller than that in FIG. 19A. Specifically, in the convergent values in FIG. 19A, the maximum value 8.17, the minimum value 7.39, the difference between the maximum value and the minimum value is 0.78, the average thereof is 7.70, and the index of unevenness is 10.2. On the contrary, in the convergent values in FIG. 19B, the maximum value 7.95, the minimum value 7.50, the difference between the maximum value and the minimum value is 0.45, the average thereof is 7.63, and the index of unevenness is 5.9. That is, in this estimation, the convergent values of the OPC process using the writing erasing method are more stable than that of the basic OPC process using the simple erasing method.

Figure 20A:
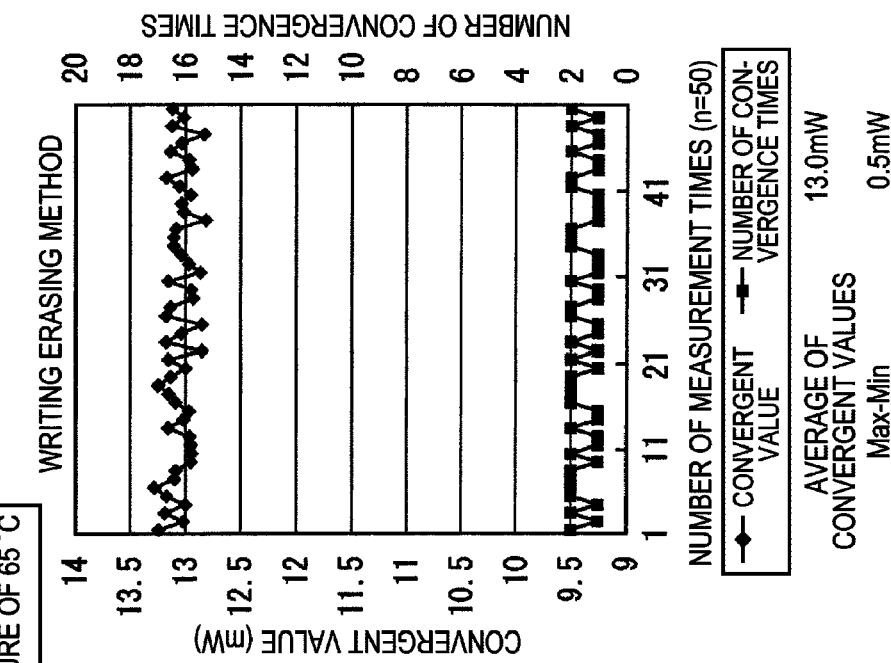
FIGS. 20A and 20B are diagrams illustrating a comparison in unevenness of OPC convergent values under a high-temperature environment.

FIGS. 20A to 22B are diagrams illustrating temperature characteristics of the OPC convergent values. In the graphs, the horizontal axis (x axis) represents the number of measurements and the vertical axis (y axis) represents the convergent value (mW). FIGS. 20A and 20B are diagrams for comparison of the number of convergence times and the unevenness of the OPC convergent values when the OPC process is performed 50 times under a high-temperature (65° C.). FIG. 20A shows the result of the basic OPC process using the simple erasing method and FIG. 20B shows the result of the OPC process using the writing erasing method.

Figure 20B:
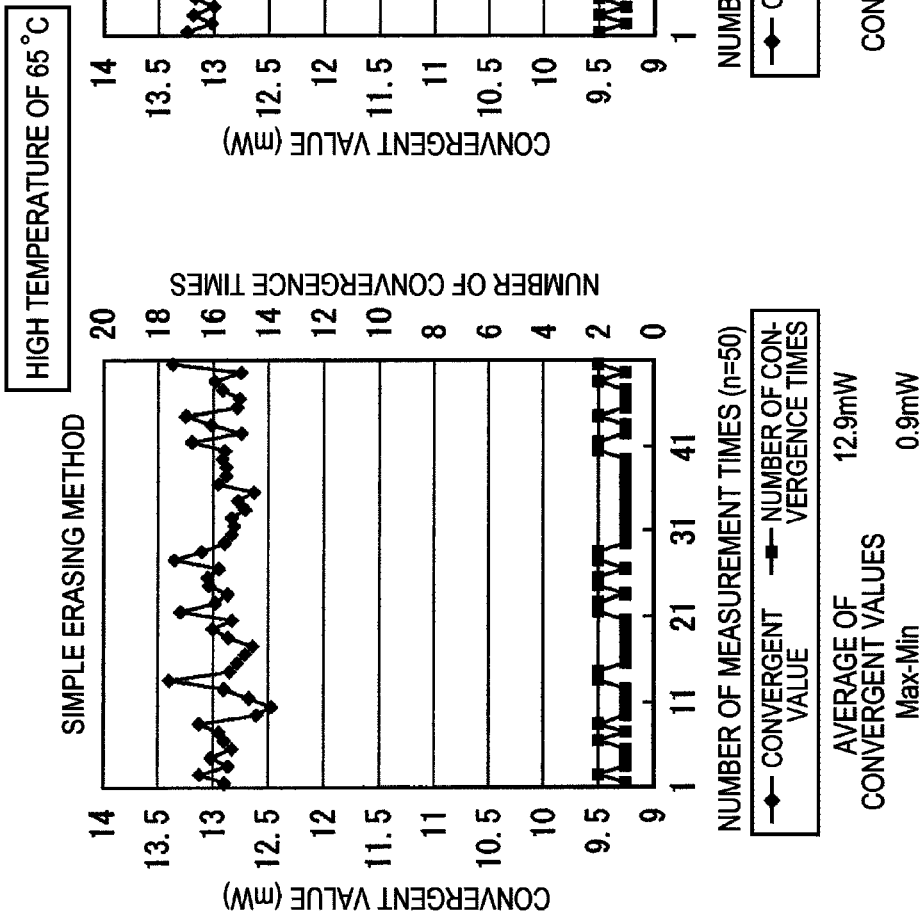

Comparing FIGS. 20A and 20B, it is clear that the unevenness of the OPC convergent values in FIG. 20B is smaller than that in FIG. 20A. Specifically, the difference between the maximum value and the minimum value of the OPC convergent values is 0.9 mW in FIG. 20A and 0.5 mW in FIG. 20B.

Figure 21A:
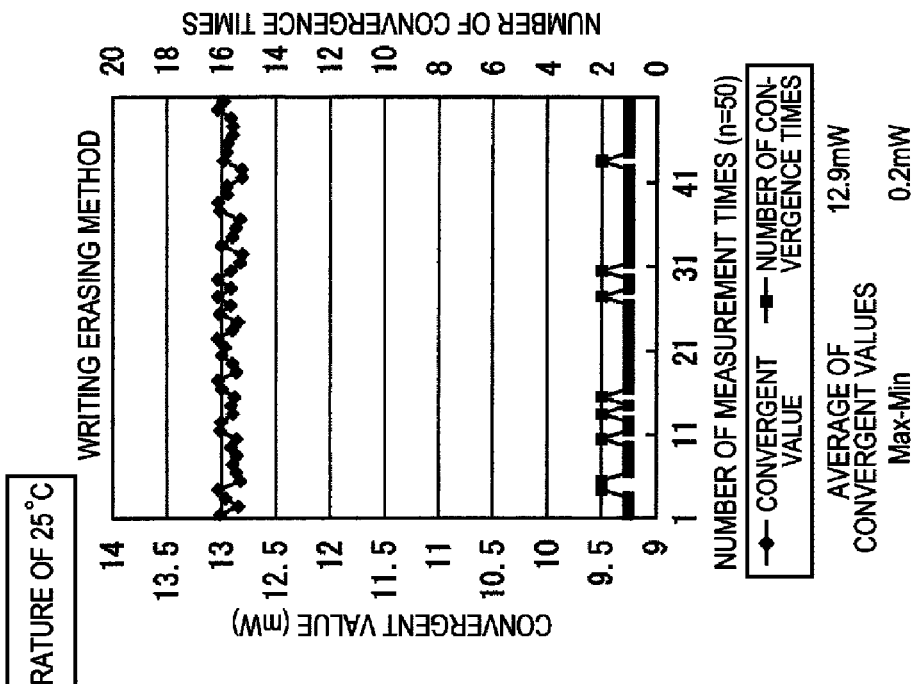
FIGS. 21A and 21B are diagrams illustrating a comparison in unevenness of the OPC convergent values under a normal-temperature environment.
Figure 21B:
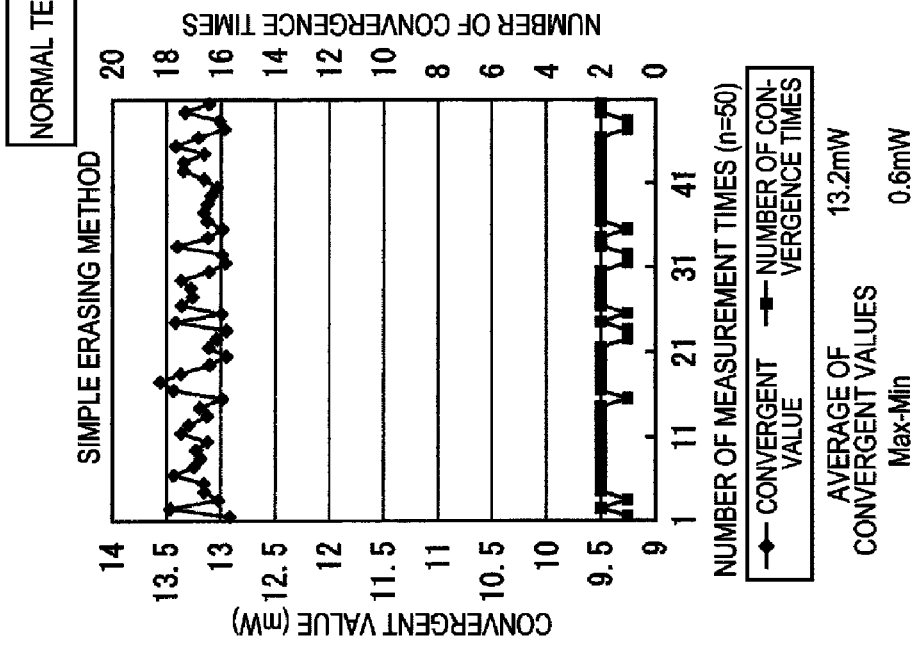

FIGS. 21A and 21B are diagrams for comparison of the number of convergence times and the unevenness of the OPC convergent values when the OPC process is performed 50 times under a normal-temperature environment (25° C.). FIG. 21A shows the result of the basic OPC process using the simple erasing method and FIG. 21B shows the result of the OPC process using the writing erasing method.

Comparing FIGS. 21A and 21B, it is clear that the unevenness of the OPC convergent values in FIG. 21B is smaller than that in FIG. 21A. Specifically, the difference between the maximum value and the minimum value of the OPC convergent values is 0.6 mW in FIG. 21A and 0.2 mW in FIG. 21B.

Figure 22A:
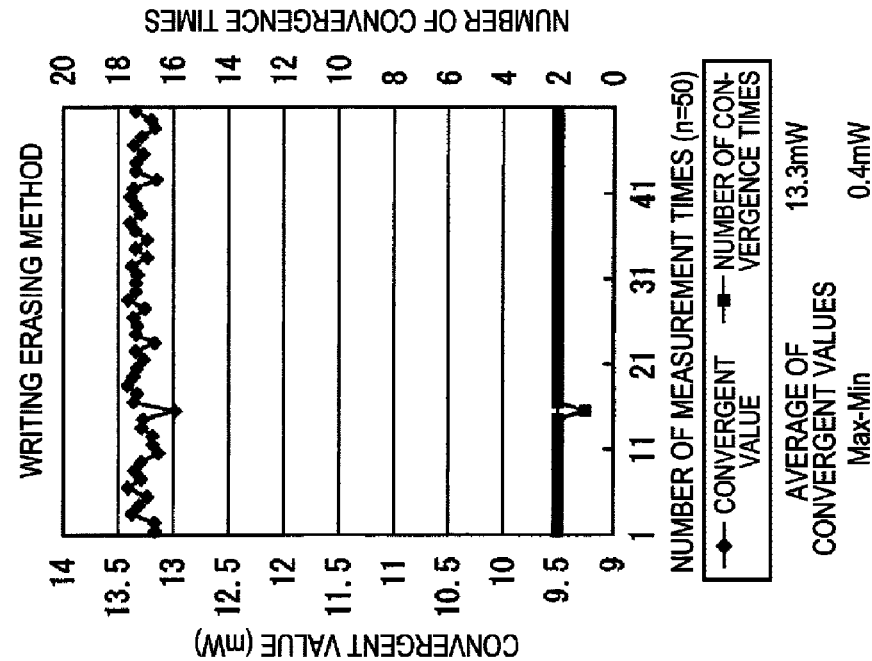
FIGS. 22A and 22B are diagrams illustrating a comparison in unevenness of the OPC convergent values under a low-temperature environment.
Figure 22B:
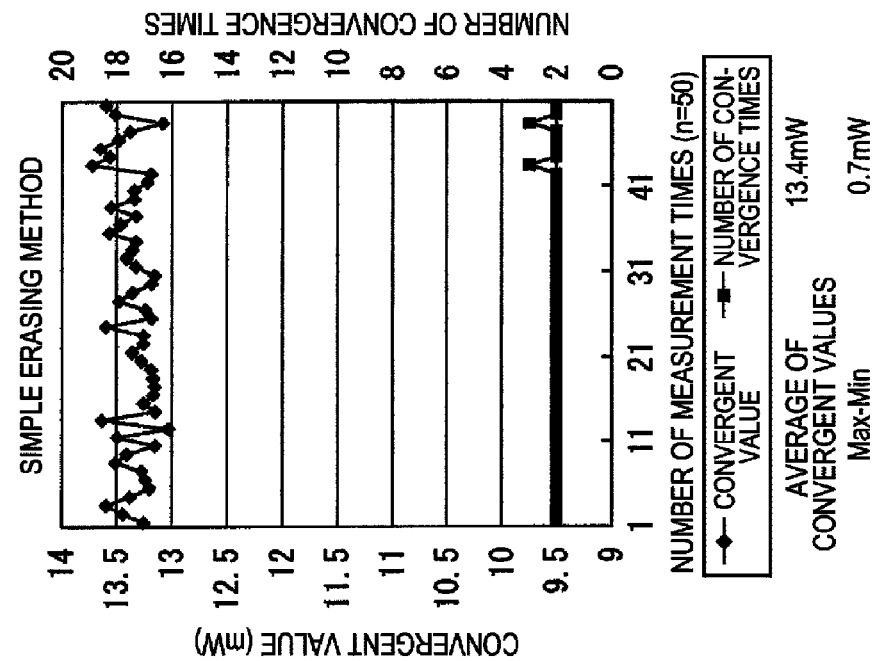

FIGS. 22A and 22B are diagrams for comparison of the number of convergence times and the unevenness of the OPC convergent values when the OPC process is performed 50 times under a low-temperature (−10° C.). FIG. 22A shows the result of the basic OPC process using the simple erasing method and FIG. 22B shows the result of the OPC process using the writing erasing method.

Comparing FIGS. 22A and 22B, it is clear that the unevenness of the OPC convergent values in FIG. 22B is smaller than that in FIG. 22A. Specifically, the difference between the maximum value and the minimum value of the OPC convergent values is 0.7 mW in FIG. 22A and 0.4 mW in FIG. 22B.

As described above, under all the temperature environments (that is, not depending on the ambient temperature), the convergent values of the OPC process using the writing erasing method are more stable than those of the basic OPC process using the simple erasing method. That is, it can be seen from the estimation results shown in FIGS. 17A to 22B that the convergent values of the OPC process using the writing erasing method are more stable than those of the basic OPC process using the simple erasing method.

Therefore, the system controller 111 can more improve the stability of the OPC convergent values than that of the OPC process using the simple erasing method, by employing the writing erasing method for the OPC process.

In the above-mentioned estimation, the erasing power of the erasing operation is set lower in the OPC process using the writing erasing method than that in the OPC process using the simple erasing method. However, according to the above-mentioned estimation results, the antecedents are better erased in the OPC process using the writing erasing method than that in the OPC process using the simple erasing method. That is, the erasing power of the erasing operation can be suppressed lower in the OPC process using the writing erasing method than that in the OPC process using the simple erasing method. Accordingly, the system controller 111 can better suppress the deterioration of the recording layer of the medium (optical disc 121) than the OPC process using the simple erasing method, by employing the writing erasing method in the OPC process. Particularly, it is possible to obtain a greater effect by repeatedly performing the OPC process.

For example, a method of suppressing the erasing remnants can be considered by changing the erasing power in a step shape to experimentally perform the erasing operation and thus calculating the better erasable erasing power. However, in this case, a troublesome work such as performing a test for calculating the erasing power should be performed. In this method, since the DC erasing operation employs the simple erasing method, the value of the erasing power increases.

On the contrary, in the above-mentioned writing erasing method, since the value calculated from the optimal recording peak power Pp described in the DI of the specification of the optical disc 121 and the ratio Pe/Pp can be employed, the system controller 111 can more easily improve the stability of the OPC convergent values. As described above, the system controller 111 can lower the value of the erasing power.

The above-mentioned OPC process can be used in various applications. For example, the number of RUBs to be subjected to the OPC process is arbitrary. The writing waveform pattern of the DC erasing process shown in FIG. 10 is not particularly limited, so long as the peak power and the erasing power are constant. In addition, the peak power or erasing power for writing and the erasing power for erasing are not particularly limited, so long as the writing or erasing operation can be normally performed. The various settings for the reference writing operation or the EVA writing operation are not particularly limited, so long as they do not depart from the normal operation ranges.

The above-mentioned processes can be executed by hardware or by software. In this case, for example, a personal computer shown in FIG. 23 can be employed.

Figure 23:
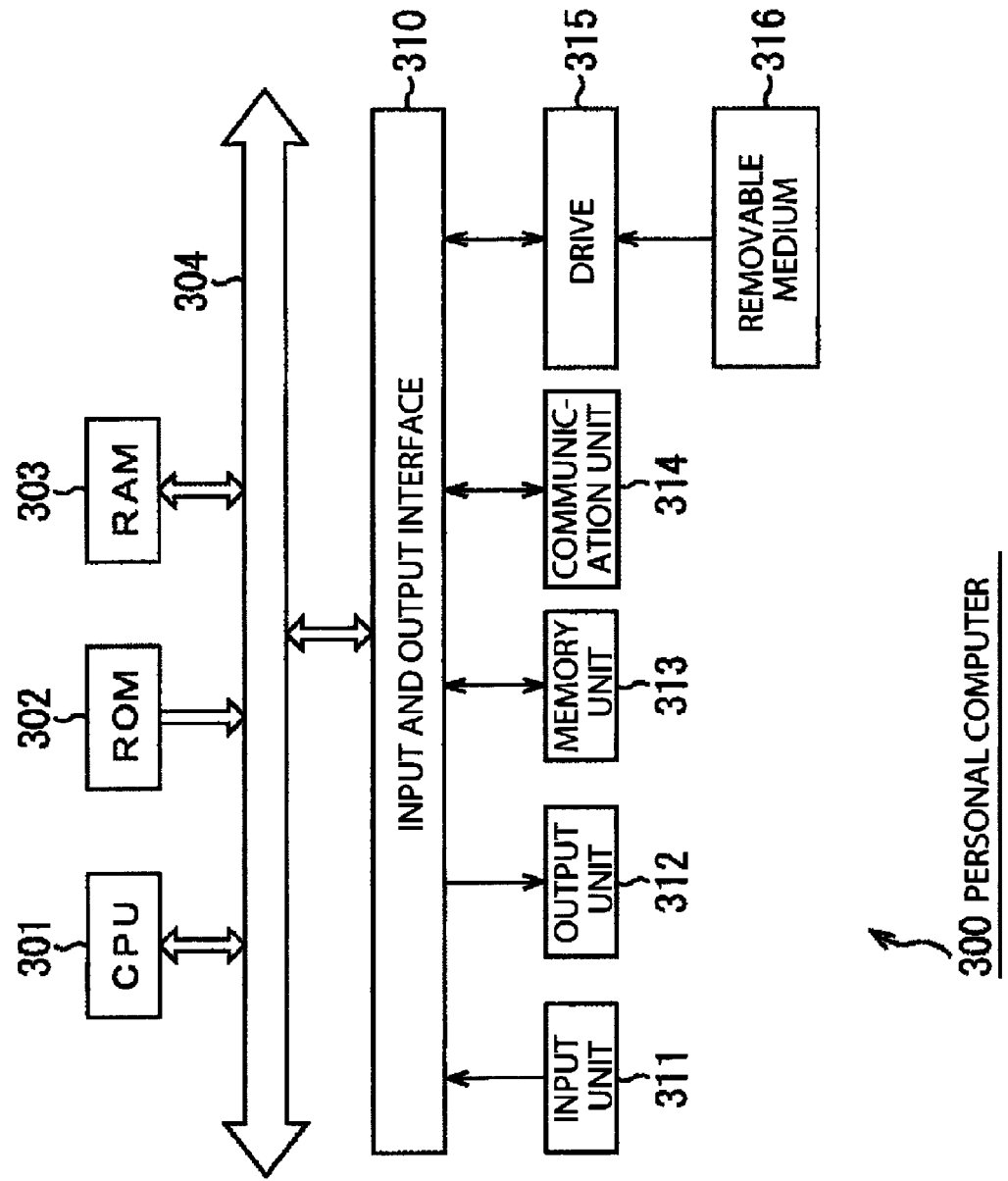
FIG. 23 is a block diagram illustrating a configuration of a personal computer to which the invention is applied.

In FIG. 23, a CPU 301 of the personal computer 300 performs various processes in accordance with programs stored in a ROM 302 or programs loaded to a RAM 303 from a memory unit 313. The RAM 303 also properly stores data necessary to allow the CPU 301 to perform various processes.

The CPU 301, the ROM 302, and the RAM 303 are connected to each other through a bus 304. An input and output interface 310 is also connected to the bus 304.

The input and output interface 310 is connected to an input unit 311 including a keyboard and a mouse, a display including a CRT (Cathode Ray Tube) or an LCD (Liquid Crystal Display), an output unit 312 including a speaker, a memory unit 313 including a hard disc, and a communication unit 314 including a modem. The communication unit 314 makes communications using networks including the Internet.

The input and output interface 310 is also connected to a drive 315 as needed. Accordingly, a removable medium 316 such as a magnetic disc, an optical disc, a magneto-optical disc, and a semiconductor memory is properly mounted and computer programs read therefrom are installed in the memory unit 313 as needed.

When the above-mentioned processes are executed by software, the programs constituting the software are installed from the networks or the recording mediums.

The recording mediums may include the removable medium 316 such as a magnetic disc (including a flexible disc) storing programs and distributed to a user for distributing programs, an optical disc (including a CD-ROM (Compact Disc-Read Only Memory) and a DVD (Digital Versatile Disc)), a magneto-optical disc (MD (Mini Disc)), and a semiconductor memory, separately from an apparatus body as shown in FIG. 23, and may additionally include the ROM 302 storing programs and distributed to a user with the apparatus body previously mounted therewith and a hard disc included in the memory unit 313.

In the invention, the steps of describing the programs stored in the recording medium include processes performed in time series in the described order and processes performed in parallel or individually, not necessarily in time series.

The configuration described as one unit may be divided into plural units. On the contrary, the configurations described as plural units may be merged into one unit. A configuration not described above may be added to the configurations of the units. As long as configurations or operations of a system as a whole are not substantially different from each other, a partial configuration of a unit may be included in a configuration of another unit. That is, the invention is not limited to the embodiments, but may be modified in various forms without departing from the gist of the invention.

The present application contains subject matter related to that disclosed in Japanese Priority Patent Application JP 2008-154151 filed in the Japan Patent Office on Jun. 12, 2008, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing device comprising:
    writing and erasing means for performing a writing erasing operation comprising writing predetermined information to a predetermined recording area of a writable optical disc serving as a recording medium and, following the writing and without reading the written predetermined information, erasing the written predetermined information from the predetermined recording area;
    estimation information writing means for writing estimation information to the predetermined recording area to and from which the predetermined information is written and erased by the writing and erasing means; and
    estimation means for reading the estimation information written to the predetermined recording area by the estimation information writing means and estimating reproduced signal of the read estimation information.

2. The information processing device according to claim 1, wherein the writing and erasing means writes a pattern including marks having a predetermined pulse train and spaces having a predetermined level of steady-state value as the predetermined information to the predetermined recording area.

3. The information processing device according to claim 2, wherein the writing and erasing means erases the predetermined information by emitting a laser beam with a level capable of erasing the marks written to the predetermined recording area.

4. The information processing device according to claim 1, wherein the estimation information writing means writes the estimation information including a repeated pattern to the predetermined recording area using a constant power level as peak power.

5. The information processing device according to claim 1, wherein the estimation information writing means writes the estimation information including a repeated pattern to the predetermined recording area while changing peak power in a step shape.

6. An information processing method of an information processing device including writing and erasing means, estimation information writing means, and estimation means, the method comprising steps of:
    performing a writing erasing operation by the writing and erasing means, the writing erasing operation comprising writing predetermined information to a predetermined recording area of a writable optical disc serving as a recording medium and, following the writing and without reading the written predetermined information, erasing the written predetermined information from the predetermined recording area;
    writing, by the estimation information writing means, estimation information to the predetermined recording area to and from which the predetermined information is written and erased; and
    reading the estimation information written to the predetermined recording area and estimating a reproduced signal of the read estimation information by the estimation means.

7. A computer-readable tangible storage medium encoded with computer-executable instructions that, when executed with at least one processor, implement computer-executable modules, the computer-executable modules comprising:
    writing and erasing means for performing a writing erasing operation comprising writing predetermined information to a predetermined recording area of a writable optical disc serving as a recording medium and, following the writing and without reading the written predetermined information, erasing the written predetermined information from the predetermined recording area;
    estimation information writing means for writing estimation information to the predetermined recording area to and from which the predetermined information is written and erased by the writing and erasing means; and
    estimation means for reading the estimation information written to the predetermined recording area by the estimation information writing means and estimating a reproduced signal of the read estimation information.

8. An information processing device comprising:
    a writing and erasing unit configured to perform a write erase operation comprising writing predetermined information to a predetermined recording area of a writable optical disc serving as a recording medium and, following the writing and without reading the written predetermined information, erasing the written predetermined information from the predetermined recording area;
    an estimation information writing unit configured to write estimation information to the predetermined recording area to and from which the predetermined information is written and erased by the writing and erasing unit; and
    an estimation unit configured to read the estimation information written to the predetermined recording area by the estimation information writing unit and estimate a reproduced signal of the read estimation information.

9. The information processing device according to claim 1, wherein:
the writing and erasing means is further for writing the predetermined information to the predetermined recording area by writing the predetermined information using a constant power level as peak power.

10. The information processing device according to claim 1, wherein:
the writing and erasing means is further for erasing the written predetermined information from the predetermined recording area using erasing power of a value that depends on a type of the recording medium.

11. The information processing device according to claim 10, wherein:
after the writing and erasing means erases the written predetermined information from the predetermined recording area, the estimation information writing means writes the estimation information that comprises a repeated pattern using a constant power level as peak power; and
after the estimation means reads the estimation information and estimates a reproduced signal of the read estimation information, the writing and erasing means performs a second writing erasing operation comprising writing the predetermined information to the predetermined recording area and, following the writing and without reading the written predetermined information, erasing the written predetermined information from the predetermined recording area.

12. The information processing device according to claim 11, wherein:
the estimation information writing means is further for, after the writing and erasing means performs the second writing erasing operation, writing the estimation information including a repeated pattern to the predetermined recording area while changing peak power in a step shape.

13. The information processing method according to claim 6, wherein:
performing the writing erasing operation comprises writing a pattern including marks having a predetermined pulse train and spaces having a predetermined level of steady-state value as the predetermined information to the predetermined recording area.

14. The information processing method according to claim 13, wherein:
performing the writing erasing operation comprises erasing the predetermined information by emitting a laser beam with a level capable of erasing the marks written to the predetermined recording area.

15. The information processing method according to claim 6, wherein:
writing, by the estimation information writing means, the estimation information to the predetermined recording area comprises writing the estimation information that comprises a repeated pattern using a constant power level as peak power.

16. The information processing method according to claim 6, wherein:
writing, by the estimation information writing means, the estimation information to the predetermined recording area comprises writing the estimation information that comprises a repeated pattern while changing peak power in a step shape.

17. The information processing method according to claim 6, wherein:
performing the writing erasing operation comprises erasing the written predetermined information from the predetermined recording area using erasing power of a value that depends on a type of the recording medium.

18. The information processing device according to claim 8, wherein:
the writing and erasing unit is further configured to perform the write erase operation that comprises writing a pattern including marks having a predetermined pulse train and spaces having a predetermined level of steady-state value as the predetermined information to the predetermined recording area.

19. The information processing device according to claim 18, wherein:
the writing and erasing unit is further configured to perform the write erase operation that comprises erasing the predetermined information by emitting a laser beam with a level capable of erasing the marks written to the predetermined recording area.

20. The information processing device according to claim 8, wherein:
the estimation information writing unit is further configured to write the estimation information comprising a repeated pattern using a constant power level as peak power.

* * * * *